(12) United States Patent
Guo et al.

(10) Patent No.: US 11,825,421 B2
(45) Date of Patent: Nov. 21, 2023

(54) POWER CONTROL METHOD AND APPARATUS

(71) Applicant: HUAWEI TECHNOLOGIES CO., LTD., Guangdong (CN)

(72) Inventors: Wenting Guo, Shanghai (CN); Jinfang Zhang, Shenzhen (CN); Zhengzheng Xiang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 17/410,565

(22) Filed: Aug. 24, 2021

(65) Prior Publication Data

US 2021/0385760 A1 Dec. 9, 2021

Related U.S. Application Data

(63) Continuation of application No. PCT/CN2020/080904, filed on Mar. 24, 2020.

(30) Foreign Application Priority Data

Mar. 29, 2019 (CN) .......................... 201910253438.3

(51) Int. Cl.
*H04B 7/00* (2006.01)
*H04W 52/24* (2009.01)
*H04W 52/36* (2009.01)

(52) U.S. Cl.
CPC ......... *H04W 52/242* (2013.01); *H04W 52/36* (2013.01)

(58) Field of Classification Search
CPC ... H04W 52/16; H04W 52/04; H04W 52/143; H04W 52/146; H04W 52/246; H04W 52/247; H04W 52/242; H04W 52/32
See application file for complete search history.

(56) References Cited

U.S. PATENT DOCUMENTS 8,660,070 B2 * 2/2014 Miki .................. H04L 5/0053
455/418
9,948,488 B2 * 4/2018 Li ..................... H04L 25/03834
(Continued)

FOREIGN PATENT DOCUMENTS

CN 106954272 A 7/2017
CN 108632965 A 10/2018
(Continued)

OTHER PUBLICATIONS

3GPP TS 36.213 V15.3.0 (Sep. 2018), " 3rd Generation Partnership Project; Technical Specification Group Radio Access Network; Evolved Universal Terrestrial Radio Access (E-UTRA); Physical layer procedures (Release 15)," Sep. 2018, pp. 474-529, 56 pages.
(Continued)

*Primary Examiner* — Tuan Pham
(74) *Attorney, Agent, or Firm* — Fish & Richardson P.C.

(57) ABSTRACT

The present disclosure discloses example power control methods and apparatuses. One example method includes determining a transmit power of a control channel and a first data subchannel, where the control channel and the first data subchannel completely overlap in time domain and do not overlap in frequency domain. A transmit power of a second data subchannel is determined to be the same as the transmit power of the control channel and the first data subchannel, where the second data subchannel and the control channel overlap in frequency domain and do not overlap in time domain. The control channel and the first data subchannel are sent to a second terminal apparatus at the transmit power of the control channel and the first data subchannel. The second data subchannel is sent to the second terminal apparatus at the transmit power of the control channel and the first data subchannel.

10 Claims, 13 Drawing Sheets

(56) References Cited

U.S. PATENT DOCUMENTS

| | | | | |
|---|---|---|---|---|
| 10,148,394 B2* | 12/2018 | Pi | ............................ | H04L 5/0026 |
| 2018/0359711 A1 | 12/2018 | Akkarakaran et al. | | |

FOREIGN PATENT DOCUMENTS

| | | |
|---|---|---|
| CN | 109151833 A | 1/2019 |
| WO | 2017039880 A1 | 3/2017 |
| WO | 2018038525 A1 | 3/2018 |
| WO | 2018087742 A1 | 5/2018 |

OTHER PUBLICATIONS

EPO Partial Supplementary European Search Report issued in European Application No. 20783273.4 dated Mar. 14, 2022, 15 pages.

Samsung, "Considerations on Sidelink Power Control," 3GPP TSG RAN WG1 #96, R1-1902286, Athens, Greece, Feb. 25-Mar. 1, 2019, 7 pages.

Huawei, HiSilicon, "Discussion on the remaining issues for sidelink power control," 3GPP TSG RAN WG1 Meeting #86bis, R1-1609373, Lisbon, Portugal, Oct. 10-14, 2016, 3 pages.

Office Action issued in Chinese Application No. 201910253438.3 dated Mar. 11, 2021, 12 pages (with English translation).

PCT International Search Report and Written Opinion issued in International Application No. PCT/CN2020/080904 dated May 19, 2020, 10 pages (partial English translation).

Zte, Sanechips, "Discussion on NR sidelink physical layer structure," 3GPP TSG RAN WG1 #96, R1-1902137, Athens, Greece, Feb. 25-Mar. 1, 2019, 10 pages.

\* cited by examiner

POWER CONTROL METHOD AND APPARATUS

CROSS-REFERENCE TO RELATED APPLICATIONS

This application is a continuation of International Application No. PCT/CN2020/080904, filed on Mar. 24, 2020, which claims priority to Chinese Patent Application No. 201910253438.3, filed on Mar. 29, 2019. The disclosures of the aforementioned applications are hereby incorporated by reference in their entireties.

TECHNICAL FIELD

This application relates to the field of communication technologies, and in particular, to a power control method and apparatus.

BACKGROUND

In a wireless communication system, after being amplified by a power amplifier to obtain an adequate radio frequency power, a signal generated by a transmit end can be fed to an antenna for radiation and sent to a receive end. The radio frequency amplifier has a feature shown in FIG. 1. FIG. 1 is a curve diagram of the feature of the radio frequency amplifier. A horizontal axis represents an input power of an input signal, and a vertical axis represents an output power of the input signal after the signal passing through the radio frequency amplifier. As shown in FIG. 1, in a linear amplification area, the radio frequency power amplifier proportionally amplifies the input signal. In a non-linear amplification area, the input signal is non-linearly amplified. As a result, the sine wave input signal is changed into a non-sine wave signal and is distorted.

To ensure that the signal is not distorted in a transmission process, an amplification factor of the radio frequency power amplifier needs to be adjusted, so that the input signal is proportionally amplified in the linear area. For example, as shown in FIG. 1, when the input power of the input signal is A and the amplification factor of the radio frequency amplifier is K1, the input signal enters the non-linear area and is distorted. In this case, the amplification factor of the radio frequency amplifier may be adjusted from K1 to K2, to ensure that the input signal is proportionally amplified by K2 times in the linear area.

It is specified in an existing 3rd generation partnership project (3GPP) protocol that in a low frequency (for example, below 6 GHz) scenario, 10 milliseconds are required for adjusting the amplification factor of the radio frequency function amplifier; in a high frequency (above 6 GHz) scenario, five milliseconds are required for adjusting the amplification factor of the radio frequency function amplifier. In this case, a time period for sending the signal is occupied. Consequently, signal transmission performance is affected and a resource waste is caused. For example, as shown in FIG. 2a and FIG. 2b, a channel sounding reference signal (SRS) is used as an example. The SRS occupies only one symbol. If transmit powers of adjacent SRSs are different, a transition time period for switching an amplification factor of a radio frequency amplifier is required between adjacent symbols. As shown in FIG. 2a, for a 15 kHz carrier spacing and a 30 kHz carrier spacing, because duration of the symbol occupied by the SRS is relatively long, the transition time period may be included in the SRS symbol. In this case, although all time-frequency resources are effectively used, a part of signals may be distorted, or a part of signals in one symbol use a different transmit power. Consequently, signal transmission performance is affected. As shown in FIG. 2b, for a 60 kHz carrier spacing, because duration of the SRS symbol is relatively short, it is defined in 3GPP that if powers of adjacent symbols change, one symbol gap is directly used as a switching time period of hardware. Consequently, a resource waste is caused.

SUMMARY

Embodiments of this application provide a power control method and apparatus, to resolve problems, in an existing signal sending process, of transmission performance deterioration and a resource waste that are caused by switching an amplification factor of a radio frequency power amplifier when different symbols have different transmit powers.

According to a first aspect, an embodiment of this application provides a power control method. The method includes: A first terminal apparatus determines a transmit power of a control channel and a first data subchannel that completely overlap in time domain and do not overlap in frequency domain; determines that a transmit power of a second data subchannel is the same as the transmit power of the control channel and the first data subchannel, where the second data subchannel and the control channel overlap in frequency domain and do not overlap in time domain; sends the control channel and the first data subchannel to a second terminal apparatus at the transmit power of the control channel and the first data subchannel; and sends the second data subchannel to the second terminal apparatus at the transmit power of the control channel and the first data subchannel.

According to the first aspect, when a data channel is divided into the first data subchannel and the second data subchannel, the first data subchannel and the control channel overlap in time domain and do not overlap in frequency domain, and the second data subchannel and the control channel overlap in frequency domain and do not overlap in time domain, the transmit power of the second data subchannel may be determined to be the same as the transmit power of the control channel and the first data subchannel, the control channel and the first data subchannel are sent to the second terminal apparatus at the transmit power of the control channel and the first data subchannel, and the second data subchannel is sent to the second terminal apparatus at the transmit power of the control channel and the first data subchannel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

With reference to the first aspect, in a possible design, before the first terminal apparatus determines the transmit power of the control channel and the first data subchannel, the method further includes: The first terminal apparatus determines the control channel and a data channel, where the data channel includes the first data subchannel and the second data subchannel.

Based on this possible design, before the method provided in this embodiment of this application, a frame structure of the control channel and the data channel may be determined as follows: The data channel is divided into the first data subchannel that overlaps the control channel in time domain and the second data subchannel that overlaps the control channel in frequency domain. This helps the first terminal apparatus perform, based on the frame structure, the power control method provided in this embodiment of this application.

With reference to the first aspect or the possible design of the first aspect, in another possible design, a bandwidth of the control channel is N, a bandwidth of the data channel is M, a bandwidth of the first data subchannel is M-N, M is greater than N, and N is a positive integer; and that the first terminal apparatus determines the transmit power of the control channel and the first data subchannel includes: The first terminal apparatus determines a transmit power $P_{control}$ of the control channel and a transmit power $P_{DATA\_A}$ of the first data subchannel based on a maximum transmit power, the bandwidth N of the control channel, and the bandwidth M-N of the first data subchannel; and uses $P_{control}+P_{DATA\_A}$ as the transmit power of the control channel and the first data subchannel and as the transmit power of the second data subchannel.

Based on this possible design, when the control channel and the first data subchannel completely overlap in time domain and do not overlap in frequency domain, power allocation may be performed between the control channel and the first data subchannel based on the bandwidth of the control channel and the bandwidth of the first data subchannel. The transmit power of the control channel and the transmit power of the first data subchannel are determined, and a sum of the determined transmit power of the control channel and the determined transmit power of the first data subchannel is used as the transmit power of the second data subchannel. This is simple and easy to implement.

With reference to the first aspect or any possible design of the first aspect, in another possible design, the transmit power $P_{control}$ of the control channel satisfies the following formula: $P_{control}=\min\{P_{CMAX}-f(N,M-N), f(N)+P_O+\alpha\cdot PL\}$; and the transmit power of the first data subchannel satisfies the following formula: $P_{DATA\_A}=\min\{P_{CMAX}-f(N,M-N), f(M-N)+P_O+\alpha\cdot PL\}$ where $P_{CMAX}$ is the maximum transmit power, $f(N,M-N)$ is a function of the bandwidth M-N of the first data subchannel and the bandwidth N of the control channel, $f(M-N)$ is a function of the bandwidth M-N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

Based on this possible design, it may be determined that the transmit power of the control channel is a smaller value of a maximum transmit power allocated to the control channel and a link-required transmit power of the control channel, and that the transmit power of the first data subchannel is a smaller value of a maximum transmit power allocated to the first data subchannel and a link-required transmit power of the first data subchannel.

With reference to the first aspect or any possible design of the first aspect, in another possible design, the transmit power of the control channel satisfies the following formula: $P_{control}=\min\{P_{CMAX}-f(N,M-N), P_{MAX\_CC}-f(N,M-N), f(N)+P_O+\alpha\cdot PL\}$; and the transmit power $P_{DATA\_A}$ of the first data subchannel satisfies the following formula:

$$P_{DATA\_A} = \min\{P_{CMAX} - f(N, M-N),$$
$$P_{MAX\_CC} - f(n, M-N), f(M-N) + P_O + \alpha \cdot PL\},$$

where $P_{CMAX}$ is the maximum transmit power, $P_{MAX\_CC}$ is a maximum transmit power that satisfies a congestion control requirement, $f(N,M-N)$ is a function of the bandwidth M-N of the first data subchannel and the bandwidth N of the control channel, $f(M-N)$ is a function of the bandwidth M-N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

Based on this possible design, it is determined based on a channel busy degree that the transmit power of the control channel is a minimum value of a maximum transmit power allocated to the control channel, a maximum transmit power that is allocated to the control channel and that satisfies the congestion control requirement, and a link-required transmit power of the control channel, and that the transmit power of the first data subchannel is a minimum value of a maximum transmit power allocated to the first data subchannel, a maximum transmit power that is allocated to the first data subchannel and that satisfies the congestion control requirement, and a link-required transmit power of the first data subchannel.

According to a second aspect, this application provides a power control apparatus. The power control apparatus may be a first terminal apparatus, or a chip or a system-on-a-chip in the first terminal apparatus; or may be a function module that is in the first terminal apparatus and that is configured to implement the method according to any one of the first aspect or the possible designs of the first aspect. The power control apparatus may implement functions performed by the first terminal apparatus in the foregoing aspect or the possible designs, and the functions may be implemented by hardware executing corresponding software. The hardware or the software includes one or more modules corresponding to the foregoing functions. For example, the power control apparatus may include:

a determining unit, configured to: determine a transmit power of a control channel and a first data subchannel, where the control channel and the first data subchannel completely overlap in time domain and do not overlap in frequency domain; and determine that a transmit power of a second data subchannel is the same as the transmit power of the control channel and the first data subchannel, where the second data subchannel and the control channel overlap in frequency domain and do not overlap in time domain; and a sending unit, configured to: send the control channel and the first data subchannel to a second terminal apparatus at the transmit power of the control channel and the first data subchannel; and send the second data subchannel to the second terminal apparatus at the transmit power of the control channel and the first data subchannel.

According to the second aspect, when a data channel is divided into the first data subchannel and the second data subchannel, the first data subchannel and the control channel overlap in time domain and do not overlap in frequency domain, and the second data subchannel and the control channel overlap in frequency domain and do not overlap in time domain, the transmit power of the second data subchannel may be determined to be the same as the transmit power of the control channel and the first data subchannel, the control channel and the first data subchannel are sent to the second terminal apparatus at the transmit power of the control channel and the first data subchannel, and the second data subchannel is sent to the second terminal apparatus at the transmit power of the control channel and the first data subchannel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

With reference to the second aspect, in a possible design, before determining the transmit power of the control channel and the first data subchannel, the determining unit is further configured to determine the control channel and a data channel, where the data channel includes the first data subchannel and the second data subchannel. Based on this possible design, before the transmit power is determined, a frame structure of the control channel and the data channel may be determined as follows: The data channel is divided into the first data subchannel that overlaps the control channel in time domain and the second data subchannel that overlaps the control channel in frequency domain. Then, the transmit power of the control channel and the first data subchannel is determined based on the frame structure.

With reference to the second aspect or any possible design of the second aspect, in another possible design, a bandwidth of the second data subchannel is M, a bandwidth of the control channel is N, a bandwidth of the first data subchannel is M−N, M is greater than N, and N is a positive integer; and the determining unit is specifically configured to: determine a transmit power $P_{control}$ of the control channel and a transmit power $P_{DATA\_A}$ of the first data subchannel based on a maximum transmit power, the bandwidth N of the control channel, and the bandwidth M−N of the first data subchannel; and use $P_{control}+P_{DATA\_A}$ as the transmit power of the control channel and the first data subchannel and as the transmit power of the second data subchannel.

Based on this possible design, power allocation may be performed between the control channel and the first data subchannel based on the bandwidth of the control channel and the bandwidth of the first data subchannel. The transmit power of the control channel and the transmit power of the first data subchannel are determined, and a sum of the determined transmit power of the control channel and the determined transmit power of the first data subchannel is used as the transmit power of the second data subchannel. This is simple and easy to implement.

With reference to the second aspect or any possible design of the second aspect, in another possible design, the transmit power $P_{control}$ of the control channel satisfies the following formula: $P_{control}=\min\{P_{CMAX}-f(N,M-N), f(N)+P_O+\alpha \cdot PL\}$; and the transmit power of the first data subchannel satisfies the following formula: $P_{DATA\_A}=\min\{P_{CMAX}-f(N,M-N), f(M-N)+P_O+\alpha \cdot PL\}$ where $P_{CMAX}$ is the maximum transmit power, $f(N,M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

Based on this possible design, it may be determined with reference to the maximum transmit power that the transmit power of the control channel is a smaller value of a maximum transmit power allocated to the control channel and a link-required transmit power of the control channel, and that the transmit power of the first data subchannel is a smaller value of a maximum transmit power allocated to the first data subchannel and a link-required transmit power of the first data subchannel.

With reference to the second aspect or any possible design of the second aspect, in another possible design, the transmit power of the control channel satisfies the following formula: $P_{control}=\min\{P_{CMAX}-f(N,M-N), P_{MAX\_CC}-f(N,M-N), f(N)+P_O+\alpha \cdot PL\}$ and the transmit power $P_{DATA\_A}$ of the first data subchannel satisfies the following formula:

$$P_{DATA\_A} = \min\{P_{CMAX} - f(N, M-N), P_{MAX\_CC} - f(n, M-N), f(M-N) + P_O + \alpha \cdot PL\},$$

where
$P_{CMAX}$ is the maximum transmit power, $P_{MAX\_CC}$ is a maximum transmit power that satisfies a congestion control requirement, $f(N,M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

Based on this possible design, it may be determined based on a channel busy degree that the transmit power of the control channel is a minimum value of a maximum transmit power allocated to the control channel, a maximum transmit power that is allocated to the control channel and that satisfies the congestion control requirement, and a link-required transmit power of the control channel, and that the transmit power of the first data subchannel is a minimum value of a maximum transmit power allocated to the first data subchannel, a maximum transmit power that is allocated to the first data subchannel and that satisfies the congestion control requirement, and a link-required transmit power of the first data subchannel.

According to a third aspect, a power control apparatus is provided. The power control apparatus may be a first terminal apparatus, or a chip or a system-on-a-chip in the first terminal apparatus. The power control apparatus may implement functions performed by the first terminal apparatus in the foregoing aspects or the possible designs, and the functions may be implemented by hardware. For example, in a possible design, the power control apparatus may include a processor and a transmitter. The processor may be configured to: determine a transmit power of a control channel and a first data subchannel that completely overlaps the control channel in time domain and that does not overlap the control channel in frequency domain; determine that a transmit power of a second data subchannel is the same as the transmit power of the control channel and the first data subchannel, where the second data subchannel and the control channel overlap in frequency domain and do not overlap in time domain; send, through the transmitter, the control channel and the first data subchannel to a second terminal apparatus at the transmit power that is of the control channel and the first data subchannel and that is determined by a determining unit; and send the second data subchannel to the second terminal apparatus at the transmit power that is of the control channel and the first data subchannel and that is determined by the determining unit. In another possible design, the power control apparatus may further include a memory. The memory is configured to store computer-executable instructions and data that are necessary for the power control apparatus. When the power control apparatus runs, the processor executes the computer-executable instructions stored in the memory, so that the power control apparatus performs the power control method according to any one of the first aspect or the possible designs of the first aspect.

According to a fourth aspect, a computer storage medium is provided. The computer-readable storage medium may be a readable non-volatile storage medium. The computer storage medium stores computer instructions. When the computer instructions are run on a computer, the computer is enabled to perform the power control method according to any one of the first aspect or the possible designs of the first aspect.

According to a fifth aspect, a computer program product including instructions is provided. When the computer program product runs on a computer, the computer is enabled to perform the power control method according to any one of the first aspect or the possible designs of the first aspect.

According to a sixth aspect, a power control apparatus is provided. The power control apparatus may be a first terminal apparatus, or a chip or a system-on-a-chip in the first terminal apparatus. The power control apparatus includes one or more processors and one or more memories. The one or more memories are coupled to the one or more processors, the one or more memories are configured to store computer program code, and the computer program code includes computer instructions. When the one or more processors execute the computer instructions, the power control apparatus is enabled to perform the power control method according to any one of the first aspect or the possible designs of the first aspect.

For technical effects achieved by any one of the designs of the third aspect to the sixth aspect, refer to the technical effects achieved by any one of the first aspect or the possible designs of the first aspect. Details are not described again.

According to a seventh aspect, an embodiment of this application provides a power control method. The method includes: A first terminal apparatus determines a transmit power of a control channel and a transmit power of a data channel, where the control channel and the data channel overlap in frequency domain and do not overlap in time domain; and if the transmit power of the control channel is greater than or equal to the transmit power of the data channel, the first terminal apparatus sends the control channel and the data channel to a second terminal apparatus at the transmit power of the control channel; or if the transmit power of the control channel is less than the transmit power of the data channel, the first terminal apparatus sends the control channel and the data channel to a second terminal apparatus at the transmit power of the data channel.

According to the seventh aspect, when the data channel and the control channel overlap in frequency domain and do not overlap in time domain, the data channel and the control channel may be sent to the second terminal apparatus at a larger transmit power of the transmit power of the control channel and the transmit power of the data channel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

With reference to the seventh aspect, in a possible design, a bandwidth of the control channel is N, a bandwidth of the data channel is M, M is greater than or equal to N, and N is a positive integer; and that the first terminal apparatus determines the transmit power of the control channel and the transmit power of the data channel includes: The first terminal apparatus determines the transmit power $P_{control}$ of the control channel based on a maximum transmit power and the bandwidth N of the control channel; and the first terminal apparatus determines the transmit power $P_{DATA}$ of the data channel based on the maximum transmit power and the bandwidth M of the data channel.

Based on this possible design, when the control channel and the data channel overlap in frequency domain and do not overlap in time domain, the transmit power of the control channel may be determined based on the maximum transmit power and the bandwidth of the control channel, and the transmit power of the data channel may be determined based on the maximum transmit power and the bandwidth of the data channel. This is simple and easy to implement.

With reference to the seventh aspect or any possible design of the seventh aspect, in another possible design, the transmit power $P_{control}$ of the control channel satisfies the following formula: $P_{control}=\min\{P_{CMAX}, f(N)+P_O+\alpha \cdot PL\}$; and the transmit power $P_{DATA}$ of the data channel satisfies the following formula: $P_{DATA}=\min\{P_{CMAX}, f(M)+P_O+\alpha \cdot PL\}$, where $P_{CMAX}$ is the maximum transmit power, $f(N)$ is a function of the bandwidth N of the control channel, $f(M)$ is a function of the bandwidth M of the data channel, $P_O$ is a target receive power of the second terminal apparatus, PL is a reference link loss, PL is a positive number, $\alpha$ is a link loss compensation coefficient, and $\alpha$ is greater than 0 and less than 1.

In this possible design, the control channel and the data channel do not overlap in time domain, that is, are not time-division multiplexed, so that no power allocation is performed between the control channel and the data channel. In view of this, it may be determined that the transmit power of the control channel is a smaller value of the maximum transmit power allocated to the first terminal apparatus and a link-required transmit power of the control channel, and that the transmit power of the data channel is a smaller value of the maximum transmit power allocated to the first terminal apparatus and a link-required transmit power of the data channel.

According to an eighth aspect, this application provides a power control apparatus. The power control apparatus may be a first terminal apparatus, or a chip or a system-on-a-chip in the first terminal apparatus; or may be a function module that is in the first terminal apparatus and that is configured to implement the method according to any one of the seventh aspect or the possible designs of the seventh aspect. The power control apparatus may implement functions performed by the first terminal apparatus in the foregoing aspect or the possible designs, and the functions may be implemented by hardware executing corresponding software. The hardware or the software includes one or more modules corresponding to the foregoing functions. For example, the power control apparatus may include:

a determining unit, configured to determine a transmit power of a control channel and a transmit power of a data channel, where the control channel and the data channel overlap in frequency domain and do not overlap in time domain; and a sending unit, configured to: when the transmit power of the control channel is greater than or equal to the transmit power of the data channel, send the control channel and the data channel to a second terminal apparatus at the transmit power of the control channel; or when the transmit power of the control channel is less than the transmit power of the data channel, send the control channel and the data channel to a second terminal apparatus at the transmit power of the data channel.

According to the eighth aspect, when the data channel and the control channel overlap in frequency domain and do not overlap in time domain, the determining unit may send, through the sending unit, the data channel and the control channel to the second terminal apparatus at a larger transmit power of the transmit power of the control channel and the transmit power of the data channel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

With reference to the eighth aspect, in a possible design, a bandwidth of the control channel is N, a bandwidth of the data channel is M, M is greater than or equal to N, and N is a positive integer; and the determining unit is specifically configured to: determine the transmit power $P_{control}$ of the control channel based on a maximum transmit power and the bandwidth N of the control channel; and determine the transmit power $P_{DATA}$ of the data channel based on the maximum transmit power and the bandwidth M of the data channel.

Based on this possible design, when the control channel and the data channel overlap in frequency domain and do not overlap in time domain, the determining unit may determine the transmit power of the control channel based on the maximum transmit power and the bandwidth of the control channel, and may determine the transmit power of the data channel based on the maximum transmit power and the bandwidth of the data channel. This is simple and easy to implement.

With reference to the eighth aspect or any possible design of the eighth aspect, in another possible design, the transmit power $P_{control}$ of the control channel satisfies the following formula: $P_{control}=\min\{P_{CMAX}, f(N)+P_O+\alpha \cdot PL\}$; and the transmit power $P_{DATA}$ of the data channel satisfies the following formula: $P_{DATA}=\min\{P_{CMAX}, f(M)+P_O+\alpha \cdot PL\}$, where $P_{CMAX}$ is the maximum transmit power, $f(N)$ is a function of the bandwidth N of the control channel, $f(M)$ is a function of the bandwidth M of the data channel, $P_O$ is a target receive power of the second terminal apparatus, PL is a reference link loss, PL is a positive number, $\alpha$ is a link loss compensation coefficient, and $\alpha$ is greater than 0 and less than 1.

In this possible design, the control channel and the data channel do not overlap in time domain, that is, are not time-division multiplexed, so that no power allocation is performed between the control channel and the data channel. In view of this, the determining unit may determine that the transmit power of the control channel is a smaller value of the maximum transmit power allocated to the first terminal apparatus and a link-required transmit power of the control channel, and that the transmit power of the data channel is a smaller value of the maximum transmit power allocated to the first terminal apparatus and a link-required transmit power of the data channel.

According to a ninth aspect, a power control apparatus is provided. The power control apparatus may be a first terminal apparatus, or a chip or a system-on-a-chip in the first terminal apparatus. The power control apparatus may implement functions performed by the first terminal apparatus in the foregoing aspects or the possible designs, and the functions may be implemented by hardware. For example, in a possible design, the power control apparatus may include a processor and a transmitter. The processor may be configured to: determine a transmit power of a control channel and a transmit power of a data channel, where the control channel and the data channel overlap in frequency domain and do not overlap in time domain; and when the transmit power of the control channel is greater than or equal to the transmit power of the data channel, send, through the transmitter, the control channel and the data channel to a second terminal apparatus at the transmit power of the control channel; or when the transmit power of the control channel is less than the transmit power of the data channel, send, through the transmitter, the control channel and the data channel to a second terminal apparatus at the transmit power of the data channel.

In another possible design, the power control apparatus may further include a memory. The memory is configured to store computer-executable instructions and data that are necessary for the power control apparatus. When the power control apparatus runs, the processor executes the computer-executable instructions stored in the memory, so that the power control apparatus performs the power control method according to any one of the seventh aspect or the possible designs of the seventh aspect.

According to a tenth aspect, a computer storage medium is provided. The computer-readable storage medium may be a readable non-volatile storage medium. The computer storage medium stores computer instructions. When the computer instructions are run on a computer, the computer is enabled to perform the power control method according to any one of the seventh aspect or the possible designs of the seventh aspect.

According to an eleventh aspect, a computer program product including instructions is provided. When the computer program product runs on a computer, the computer is enabled to perform the power control method according to any one of the seventh aspect or the possible designs of the seventh aspect.

According to a twelfth aspect, a power control apparatus is provided. The power control apparatus may be a first terminal apparatus, or a chip or a system-on-a-chip in the first terminal apparatus. The power control apparatus includes one or more processors and one or more memories. The one or more memories are coupled to the one or more processors, the one or more memories are configured to store computer program code, and the computer program code includes computer instructions. When the one or more processors execute the computer instructions, the power control apparatus is enabled to perform the power control method according to any one of the seventh aspect or the possible designs of the seventh aspect.

For technical effects achieved by any one of the designs of the ninth aspect to the twelfth aspect, refer to the technical effects achieved by any one of the seventh aspect or the possible designs of the seventh aspect. Details are not described again.

According to a thirteenth aspect, an embodiment of this application provides a power control system. The system includes the power control apparatus and the second terminal apparatus according to any one of the second aspect to the sixth aspect, or includes the power control apparatus and the second terminal apparatus according to any one of the eighth aspect to the twelfth aspect.

DETAILED DESCRIPTION OF EMBODIMENTS

The following describes implementations of embodiments of this application in detail with reference to accompanying drawings in this specification.

A power control method provided in the embodiments of this application may be applied to any communication system in which a control channel and a data channel are hybrid multiplexed. The communication system may be a 3rd generation partnership project (3GPP) communication system, for example, a long term evolution (LTE) system. Alternatively, the communication system may be a 5th generation (5G) mobile communication system, a new radio (NR) system, an NR-vehicle-to-everything (V2X) system, and another next-generation communication system. Alternatively, the communication system may be a non-3GPP communication system. This is not limited. The following uses FIG. 3 as an example to describe the method provided in the embodiments of this application.

Figure 1:
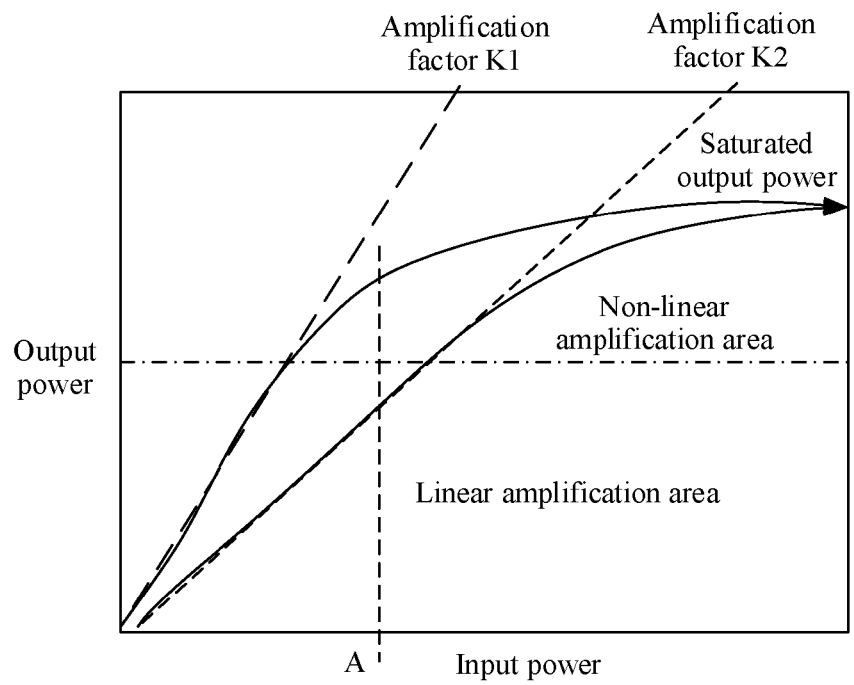
FIG. 1 is a curve diagram of a feature of a radio frequency amplifier.
Figure 2A:
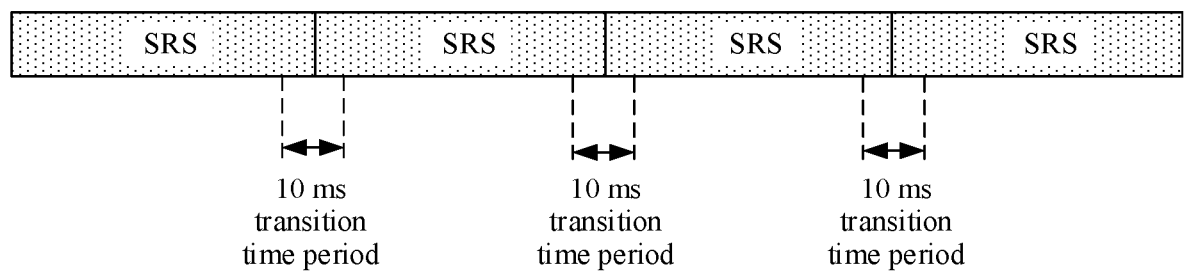
FIG. 2a is a schematic diagram of switching an amplification factor of a radio frequency amplifier in a current technology.
Figure 2B:
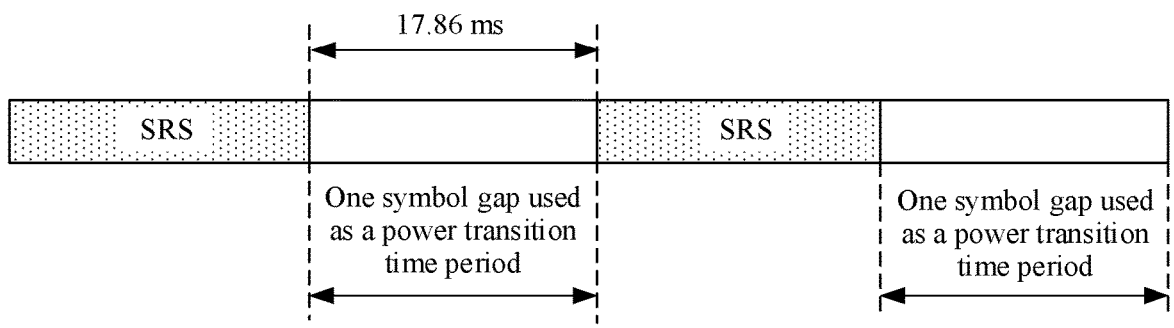
FIG. 2b is a schematic diagram of switching an amplification factor of a radio frequency amplifier in a current technology.
Figure 3:
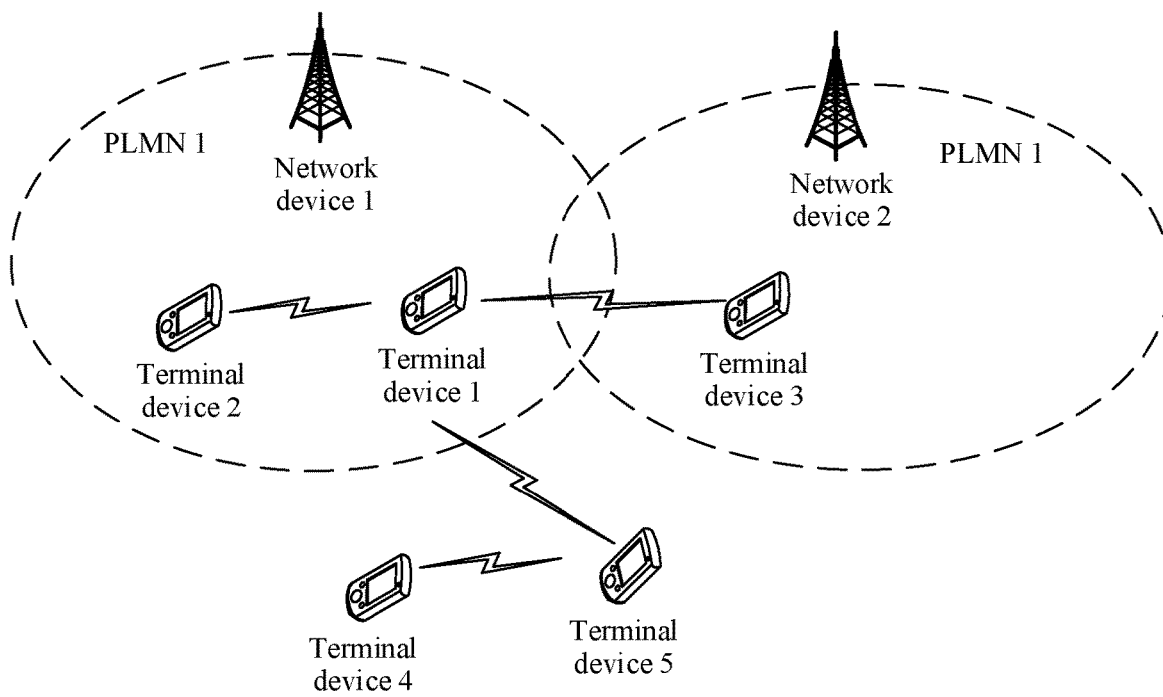
FIG. 3 is a schematic composition diagram of a communication system according to an embodiment of this application.

FIG. 3 is a schematic diagram of a communication system according to an embodiment of this application. As shown in FIG. 3, the communication system may include a network device and a terminal device. The terminal device may be located in cell coverage or outside cell coverage. The terminal device may communicate with the network device through a Uu interface, or may perform device-to-device (D2D) communication or V2X communication with another terminal device through a sidelink (or a PC5 interface). Terminal devices that communicate through a sidelink may be both located outside cell coverage. As shown in FIG. 3, a terminal device 4 and a terminal device 5 are located outside cell coverage, and the terminal device 4 and the terminal device 5 may communicate through a sidelink. Alternatively, one may be located in cell coverage, and the other may be located in cell coverage. As shown in FIG. 3, a terminal device 1 may communicate with the terminal device 5 through a sidelink, the terminal device 1 is located in cell coverage, and the terminal device 5 is located outside cell coverage. Alternatively, the terminal devices may be both located in coverage of a same cell and in a same public land mobile network (PLMN) such as a PLMN 1. As shown in FIG. 3, the terminal device 1 and a terminal device 2 are both located in the PLMN 1. Alternatively, the terminal devices may be located in a same PLMN such as the PLMN 1 but in coverage of different cells. As shown in FIG. 3, the terminal device 2 and a terminal device 3 are both located in the PLMN 1 but are located in coverage of different cells. Although not shown in FIG. 3, the terminal devices that communicate through the sidelink may alternatively be located in different PLMNs and in different cells, for example, located in common coverage of different cells in different PLMNs, or located in coverage of respective serving cells in different PLMNs.

The network device in FIG. 3 may be any device having a wireless transceiver function, and is mainly configured to implement functions such as a radio physical control function, resource scheduling and radio resource management, radio access control, and mobility management. Specifically, the network device may be an access network (AN) device/a radio access network (RAN) device, or may be a device including a plurality of 5G-AN/5G-RAN nodes, or may be a NodeB (NB), an evolved NodeB (eNB), a next generation NodeB (gNB), a transmission reception point (TRP), a transmission point (TP), a road side unit (RSU), any node in another type of access node, or the like. This is not limited.

The terminal device in FIG. 3 may be referred to as a terminal, user equipment (UE), a mobile station (MS), a mobile terminal (MT), or the like. The terminal device may be deployed on water (for example, on a ship), or may be deployed in air (for example, on an airplane, a balloon, and a satellite). Specifically, the terminal in FIG. 3 may be a mobile phone, a tablet computer, or a computer having a wireless transceiver function. Alternatively, the terminal may be a virtual reality (VR) terminal, an augmented reality (AR) terminal, a wireless terminal in industrial control, a wireless terminal in unmanned driving, a wireless terminal in telemedicine, a wireless terminal in a smart grid, a wireless terminal in a smart city, a wireless terminal in a smart home, a vehicle-mounted terminal, a vehicle having a V2V communication capability, or the like. This is not limited.

It should be noted that FIG. 3 is merely an example of the accompanying drawing; a quantity of devices included in FIG. 3 is not limited; and in addition to the devices shown in FIG. 3, the communication architecture may further include another device. In addition, a name of each device in FIG. 3 is not limited. In addition to the names shown in FIG. 3, each device may also be named another name. This is not limited.

In the communication system shown in FIG. 3, there are the following two resource allocation methods: 1. a base station (or network device) scheduling mode: the base station (or the network device) indicates a transmission resource to the terminal device; 2. a contention mode: the network device allocates a resource pool including a large quantity of resources to the terminal device, and a plurality of terminal devices may select, from the resource pool in a contention manner, a transmission resource required by the terminal device. After the terminal device obtains the transmission resource in the two manners, the terminal device may send a data signal and a control channel on the obtained transmission resource.

Figure 4:
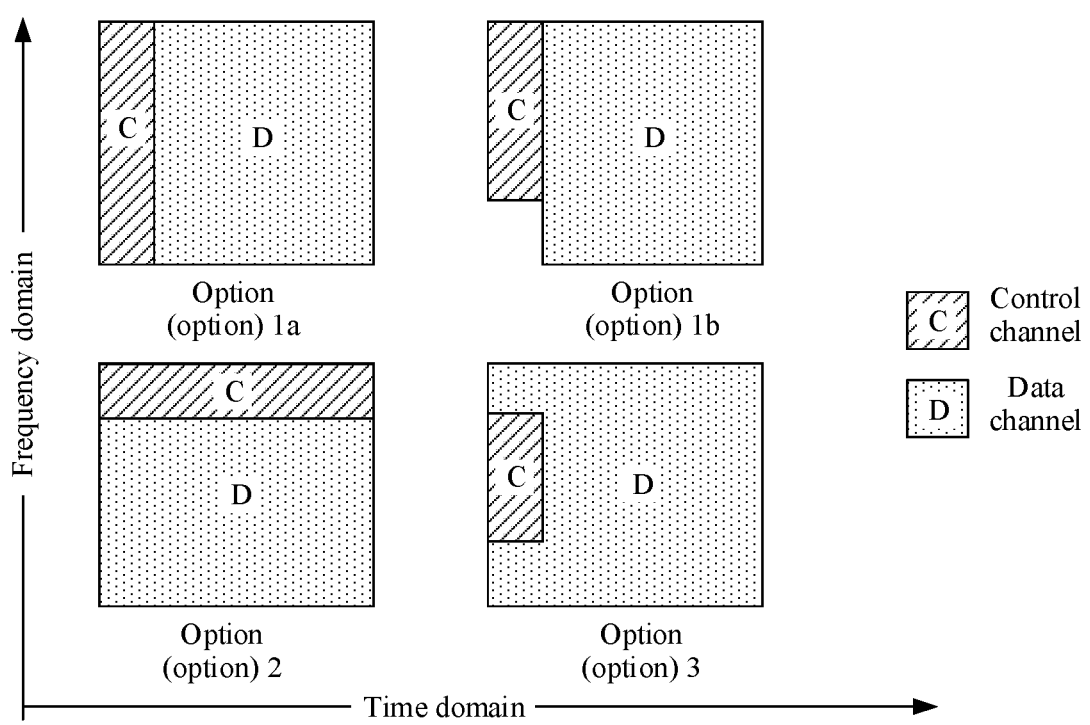
FIG. 4 is a schematic diagram of four frame structures of a control channel and a data channel that are hybrid multiplexed.

In the embodiments of this application, the terminal device may send the data channel and the control channel to a peer end device after multiplexing the data channel and the control channel. For example, the terminal device may send the data channel and the control channel by using four frame structures shown in FIG. 4. As shown in FIG. 4, the four frame structures are separately: an option 1a in which the control channel and the data channel completely overlap in frequency domain and do not overlap in time domain; an option 1b in which the control channel and the data channel overlap in frequency domain and do not overlap in time domain; an option 2 in which the control channel and the data channel completely overlap in time domain and do not overlap in frequency domain; and an option 3 in which the control channel and a part of the data channel completely overlap in time domain and do not overlap in frequency domain and the control channel and the remaining part of the data channel overlap in frequency domain and do not overlap in time domain.

It should be noted that the control channel described in the embodiments of this application may be referred to as a sidelink control channel or a physical sidelink shared channel (PSSCH), and may be a channel used to carry sidelink control information (SCI). The SCI may include decoding information of data transmitted in the data channel, and the like. The data channel described in the embodiments of this application may be referred to as a sidelink data channel or a physical sidelink control channel (PSCCH), and is a channel used to carry data. The data may be data sent by a transmit end to a receive end.

For the option 2 frame structure, a transmit power of the control channel and a transmit power of the data channel are discussed in a 3GPP protocol as follows: Using a resource graph shown in the option 2 as an example, the control channel and the data channel are multiplexed together in a frequency division manner; and from a time domain perspective, the control channel and the data channel coexist. The transmit power of the control channel and the transmit power of the data channel need to be considered together, and power allocation needs to be performed between the control channel and the data channel.

For example, when the resource allocation manner is the base station scheduling mode, the transmit power of the data channel may satisfy the following formula (1):

$$P_{PSSCH} = 10\log_{10}\left(\frac{M_{PSSCH}}{M_{PSSCH} + 10^{\frac{3}{10}} \times M_{PSCCH}}\right) + \qquad (1)$$

$$\min\left\{P_{CMAX}, 10\log_{10}\left(M_{PSSCH} + 10^{\frac{3}{10}} \times M_{PSCCH}\right) + \right.$$

$$\left. P_{O\_PSSCH,3} + \alpha_{PSSCH,3} \cdot PL\right\}[dBm];$$

and
the transmit power of the control channel may satisfy the following formula (2):

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + \qquad (2)$$

$$\min\left\{P_{CMAX}, 10\log_{10}\left(M_{PSSCH} + 10^{\frac{3}{10}} \times M_{PSCCH}\right) + \right.$$

$$\left. P_{O\_PSSCH,3} + \alpha_{PSSCH,3} \cdot PL\right\}[dBm].$$

$P_{PSSCH}$ is the transmit power of the data channel, $P_{PSCCH}$ is the transmit power of the control channel, $M_{PSSCH}$ is a bandwidth of the data channel, $M_{PSCCH}$ is a bandwidth of the control channel, and $P_{CMAX}$ is a maximum transmit power and may also be understood as a maximum transmit power allowed by the terminal device. PL is a downlink power loss of the terminal device. In a communication system, especially in a time division duplexing (TDD) system, it is usually considered that an uplink loss and a downlink loss are consistent. Therefore, the PL may be used to indicate a possible link loss from the terminal device to a network side. $P_{O\_PSSCH\_3}$ is a power expected to be received by the terminal device (which may also be understood as a target receive power of the terminal device), where 3 indicates that the resource allocation mode is the base station scheduling mode. $\alpha_{PSSCH,3}$ is a link loss compensation coefficient configured on the network side in the base station scheduling mode.

Further, the foregoing formula (1) may be changed to the following formula (3):

$$P_{PSCCH} = \min\left\{P_{CMAX} - 10\log_{10}\left(1 + \frac{10^{\frac{3}{10}} \times M_{PSCCH}}{M_{PSSCH}}\right),\right. \qquad (3)$$

$$\left. 10\log_{10}(M_{PSSCH}) + P_{O\_PSSCH,3} + \alpha_{PSSCH,3} \cdot PL\right\}[dBm]; \text{ and}$$

the foregoing formula (2) may be changed to the following formula (4):

$$P_{PSCCH} = \min\left\{P_{CMAX} - 10\log_{10}\left(1 + \frac{M_{PSCCH}}{10^{\frac{3}{10}} \times M_{PSSCH}}\right),\right. \quad (4)$$

$$\left. 10\log_{10}\left(10^{\frac{3}{10}} \times M_{PSSCH}\right) + P_{O\_PSSCH,3} + \alpha_{PSSCH,3} \cdot PL\right\}[\text{dBm}].$$

It can be learned from observing the formula (3) and the formula (4) that the formula (3) and the formula (4) separately include two sub-items, where the first item indicates a maximum transmit power allocated to the current channel, for example, the first item in the formula (3) may indicate a maximum transmit power allocated to the data channel, and the first item in the formula (4) may indicate a maximum transmit power allocated to the control channel. According to the first item, it can be learned that the maximum transmit power allocated to the control channel or the data channel is proportional to the bandwidth of the channel; and compared with the data channel, a transmit power of each subchannel of the control channel is enhanced by $10^{3/10}$ times. That is, an entire transmit power allowed by hardware of the terminal device is allocated to the control channel and the data channel in proportion to the bandwidths. It should be noted that, in the embodiments of this application, the $10^{3/10}$-time enhancement is merely an example, and it indicates that the power of the control channel may be enhanced. In addition to $10^{3/10}$, another form of enhancement may alternatively be performed. This is not limited.

The second item of the formula (3) or the formula (4) indicates a link budget, that is, an expected link transmit power (or a link-required transmit power), that is calculated based on the link loss of a Uu interface and an expected signal-to-noise ratio (SNR). Finally, the transmit power of the data channel and the transmit power of the control channel are separately a smaller value of the first item and the second item. That is, when the transmit power allowed by the terminal device is large enough, the data channel and the control channel are sent at the link-required transmit power (or the link budget transmit power); when the power allowed by the terminal device is less than a link requirement, the data channel and the control channel are sent to the second terminal apparatus at the maximum power allowed by the terminal device.

For example, when the resource allocation manner is the contention mode, the power of the data channel may satisfy the following formula (5):

$$P_{PSSCH} = 10\log_{10}\left(\frac{M_{PSSCH}}{M_{PSSCH} + 10^{\frac{3}{10}} \times M_{PSCCH}}\right) + A, \text{ where} \quad (5)$$

A may satisfy the following formula (6):

$$A = \min\left\{P_{CMAX}, P_{MAX\_CC}, 10\log_{10}\left(M_{PSSCH} + 10^{\frac{3}{10}} \times M_{PSCCH}\right) + \right. \quad (6)$$

$$\left. P_{O\_PSSCH,4} + \alpha_{PSSCH,4} \cdot PL\right\};$$

(6); and
the power of the control channel may satisfy the following formula (7):

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B, \text{ where} \quad (7)$$

B may satisfy the following formula (8):

$$B = \min\left\{P_{CMAX}, P_{MAX\_CC}, 10\log_{10}\left(M_{PSSCH} + 10^{\frac{3}{10}} \times M_{PSCCH}\right) + \right. \quad (8)$$

$$\left. P_{O\_PSSCH,4} + \alpha_{PSSCH,4} \cdot PL\right\}.$$

$P_{MAX\_CC}$ in the foregoing formula (6) and formula (8) is a maximum transmit power that satisfies a congestion control requirement.

The foregoing shows descriptions of power control performed for the option 2 frame structure in the 3GPP protocol. After the foregoing power control method is used, transmit powers on different symbols in the option 2 frame structure may be the same. This avoids problems of transmission performance deterioration and a resource waste that are caused by switching an amplification factor between different symbols. However, for the option 1a, the option 1b, and the option 3 in FIG. 4, where the option 3 shows a hybrid multiplexing scenario in which the control channel and the data channel not only overlap in time domain, but also overlap in frequency domain, if the power control method for the option 2 frame structure is used, transmit powers on different symbols cannot be the same. In other words, the foregoing power control method for the option 2 frame structure is not applicable to power control for the option 1a, the option 1b, and the option 3 in FIG. 4. In view of this, the embodiments of this application provide new power control methods for the option 1a, the option 1b, and the option 3 in FIG. 4. Specifically, for a power control method for the option 3 in FIG. 4, refer to an embodiment corresponding to FIG. 5 in the embodiments of this application. For a power control method for the option 1a frame structure and the option 1b frame structure in FIG. 4, refer to an embodiment corresponding to FIG. 9.

The following describes the power control method provided in the embodiments of this application with reference to the communication system shown in FIG. 3 by using an example in which the communication system supports the option 3 frame structure in FIG. 4. It should be noted that, in the following embodiments of this application, a name of a message exchanged between network elements, a name of each parameter in the message, or the like is merely an example, and may also be another name during specific implementation. This is not specifically limited in the embodiments of this application. In addition, terms such as "first" and "second" in the embodiments of this application are used to distinguish between different objects, but are not used to describe a specific sequence of the objects. Attributes of different objects represented by "first" and "second" are not limited in the embodiments of this application.

Figure 5:
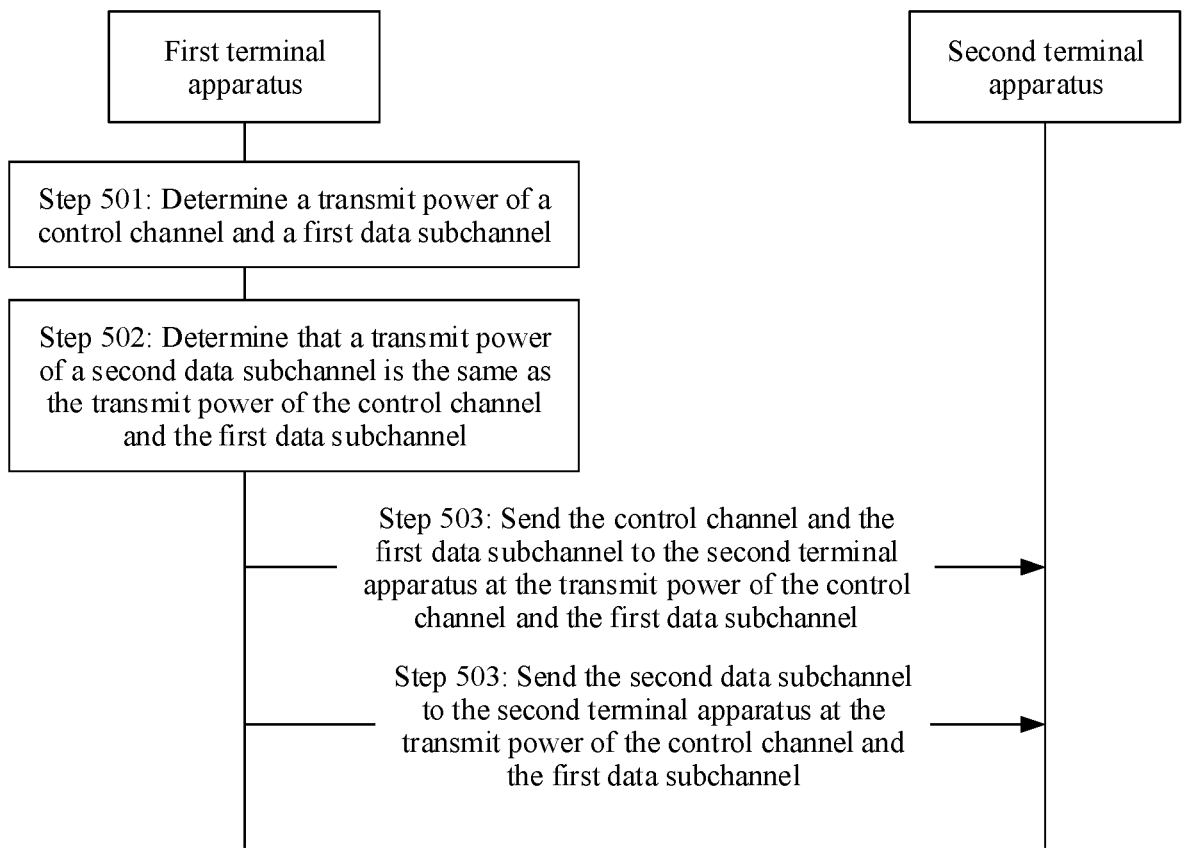
FIG. 5 is a flowchart of a power control method according to an embodiment of this application.

FIG. 5 is a flowchart of a power control method according to an embodiment of this application. The method is used to perform power control on the data channel and the control channel in the option 3 in FIG. 4. As shown in FIG. 5, the method may include the following steps.

Step 501: A first terminal apparatus determines a transmit power of the control channel and a first data subchannel.

The first terminal apparatus may be any terminal device in the communication system shown in FIG. 3.

The control channel may be a PSCCH, and the first data subchannel may be a part of the data channel, for example, may be a part of a PSSCH. The control channel and the first data subchannel may completely overlap in time domain and not overlap in frequency domain. For example, a multiplexing relationship between the control channel and the first data subchannel may be shown in the option 3 in FIG. 4.

Figure 6A:
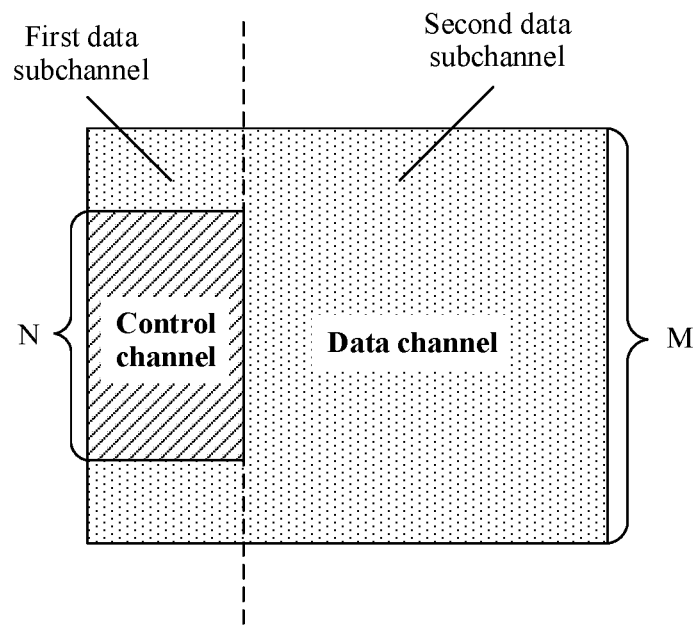
FIG. 6a is a schematic diagram of a data channel and a control channel according to an embodiment of this application.
Figure 6B:
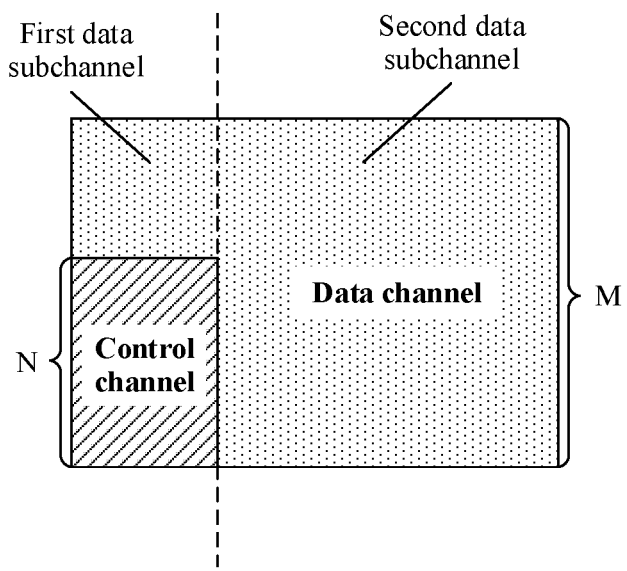
FIG. 6b is another schematic diagram of a data channel and a control channel according to an embodiment of this application.
Figure 6C:
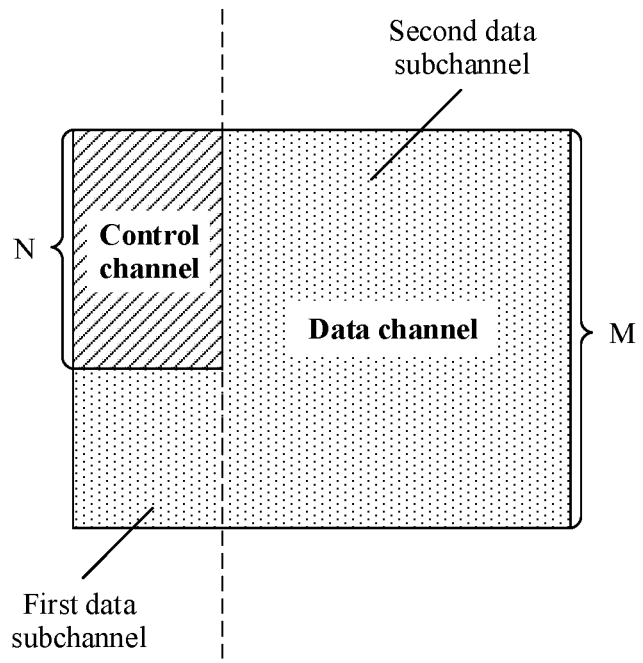
FIG. 6c is still another schematic diagram of a data channel and a control channel according to an embodiment of this application.
Figure 6D:
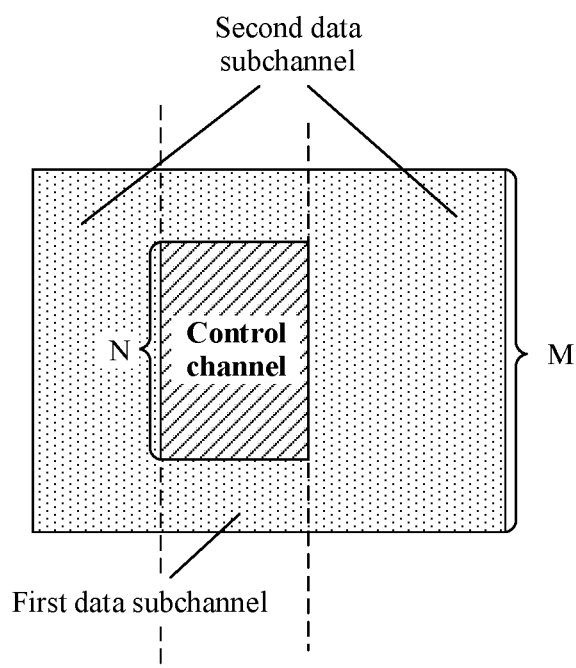
FIG. 6d is still another schematic diagram of a data channel and a control channel according to an embodiment of this application.
Figure 6E:
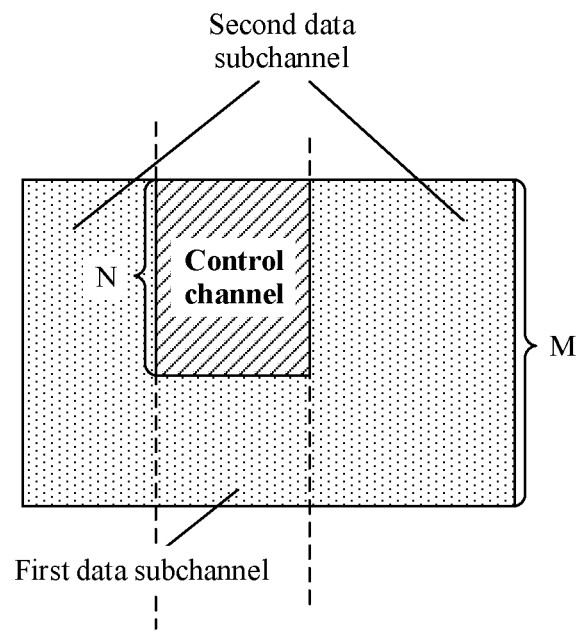
FIG. 6e is still another schematic diagram of a data channel and a control channel according to an embodiment of this application.
Figure 6F:
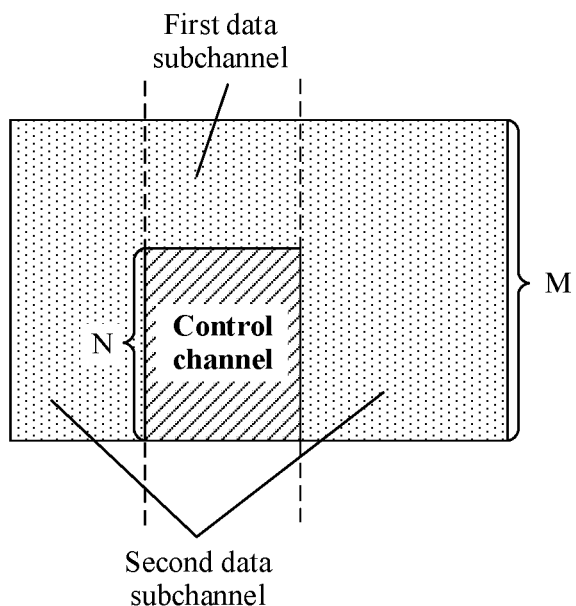
FIG. 6f is still another schematic diagram of a data channel and a control channel according to an embodiment of this application.

To more vividly understand the option 3 frame structure in FIG. 4 that is described in the embodiments of this application, FIG. 6a to FIG. 6f provide several possible cases of the option 3 frame structure. FIG. 6a is used as an example. As shown in FIG. 6a, the data channel may be divided into the first data subchannel and a second data subchannel. In other words, the first data subchannel and the second data subchannel may form the complete data channel. Alternatively, the first data subchannel and the second data subchannel may form the complete data channel. The first data subchannel and the control channel overlap in time domain but do not overlap in frequency domain, and the second data subchannel and the control channel overlap in frequency domain but do not overlap in time domain. In other words, the first data subchannel and the control channel have a time domain multiplexing relationship but do not have a frequency domain multiplexing relationship, and the second data subchannel and the control channel have a frequency domain multiplexing relationship but do not have a time domain multiplexing relationship.

For example, a bandwidth of the data channel is M, a bandwidth of the control channel is N, and M is greater than N. In this case, a bandwidth of the first data subchannel is M−N, and a bandwidth of the second data subchannel is M. It may be understood that M may represent M resource units, and N may represent N resource units. The resource unit may be a resource block (RB), a subcarrier, or a resource unit at another granularity. This is not limited. That the resource unit is the RB is used as an example. In this embodiment of this application, M may represent M RBs, and N may represent N RBs. It should be noted that specific values of M and N are not limited in this embodiment of this application.

It may be understood that, for other possible cases in which the data channel and the control channel overlap in frequency domain and in time domain, refer to schematic diagrams shown in FIG. 6b to FIG. 6f. Details are not described herein one by one.

For example, the first terminal apparatus may determine, with reference to the power control method, in 3GPP, for the option 2 frame structure in FIG. 4, a transmit power $P_{control}$ of the control channel and a transmit power $P_{DATA\_A}$ of the first data subchannel based on a maximum transmit power, the bandwidth N of the control channel, and the bandwidth M−N of the first data subchannel. Specifically, the following describes a detailed process in which the first terminal apparatus determines the transmit power of the control channel and the transmit power of the first data subchannel.

Step 502: The first terminal apparatus determines that a transmit power of the second data subchannel is the same as the transmit power of the control channel and the first data subchannel, where the second data subchannel and the control channel overlap in frequency domain and do not overlap in time domain.

For example, the first terminal apparatus may use $P_{control}$+$P_{DATA\_A}$ as the transmit power of the second data subchannel. Specifically, the following describes a detailed process in which the first terminal apparatus determines that the transmit power of the second data subchannel is the same as the transmit power of the control channel and the first data subchannel.

Step 503: The first terminal apparatus sends the control channel and the first data subchannel to a second terminal apparatus at the transmit power of the control channel and the first data subchannel; and sends the second data subchannel to the second terminal apparatus at the transmit power of the control channel and the first data subchannel.

The second terminal apparatus may be any device, in the communication system shown in FIG. 3, that perform sidelink communication with the first terminal apparatus. For example, the first terminal apparatus may send the control channel and the first data subchannel to the second terminal apparatus at the transmit power of the control channel and the first data subchannel and send the second data subchannel to the second terminal apparatus at the transmit power of the control channel and the first data subchannel according to a sending procedure shown in FIG. 7. An example is provided as follows:

The first terminal device generates data channel information and control channel information; performs channel coding on the data channel information and the control channel information to generate the first data subchannel, the control channel, and the second data subchannel; and performs, based on the transmit power of the control channel and the first data subchannel, power control on the channel obtained after coding, for example, adjusts the power of the second data subchannel obtained after coding to the transmit power of the control channel and the first data subchannel. Then, resource mapping processing is performed on each channel obtained after power control, so that the channel is mapped to a physical time-frequency resource, where a format of the time-frequency resource obtained after mapping is shown in the option 3. Finally, the channels are combined to form data of one subframe after fast Fourier transformation (FFT)+framing processing are performed on the channels, and the data of the subframe is sent through a radio frequency component (for example, amplification processing of a radio frequency amplifier), so that the data channel and the control channel are sent to the second terminal apparatus.

The data channel information may be information carried on the data channel, for example, data to be sent by the first terminal apparatus to the second terminal apparatus. The control channel information is information carried on the control channel, for example, may be SCI. In addition, for specific processing processes such as channel coding, power control, resource mapping, and FFT+framing shown in FIG. 7, refer to a current technology. Details are not described.

Correspondingly, after receiving the first data subchannel, the second data subchannel, and the control channel that are sent by the first terminal apparatus, the second terminal apparatus may estimate the transmit power of the control channel, and obtain the control channel through demodulation based on the estimated transmit power. In addition, the second terminal apparatus may estimate the transmit power of the first data subchannel and the transmit power of the second data subchannel; obtain the first data subchannel through demodulation based on the estimated transmit power of the first data subchannel; obtain the second data subchannel through demodulation based on the estimated transmit power of the second data subchannel; and combine the first data subchannel and the second data subchannel that are obtained through demodulation, to obtain the data channel. For a specific manner in which the second terminal apparatus receives the control channel, refer to the current technology. For a manner in which the second terminal apparatus receives the first data subchannel and the second data subchannel, refer to FIG. 8.

The second terminal apparatus receives the first data subchannel, the second data subchannel, and the control channel that are sent by the first terminal apparatus; and performs deframing+inverse fast Fourier transformation (IFFT) and separation processing on the received channels, to obtain the first data subchannel, the second data subchannel, and the control channel. Then, channel estimation and multi-input multi-output (MIMO) decoding are performed on the first data subchannel and the second data subchannel that are obtained after separation; and data channel combination is performed, based on channel quality, on the first data subchannel and the second data subchannel that are obtained after MIMO decoding, to obtain the data channel. Finally, channel decoding is performed on the data channel obtained after combination, to obtain the data channel information sent by the first terminal apparatus to the second terminal apparatus. The channel quality used in the process shown in FIG. 8 may be a signal-to-noise ratio or a signal to interference plus noise ratio. When data channel combination is performed on the first data subchannel and the second data subchannel, maximum ratio combining may be performed based on the channel quality.

Figure 8:
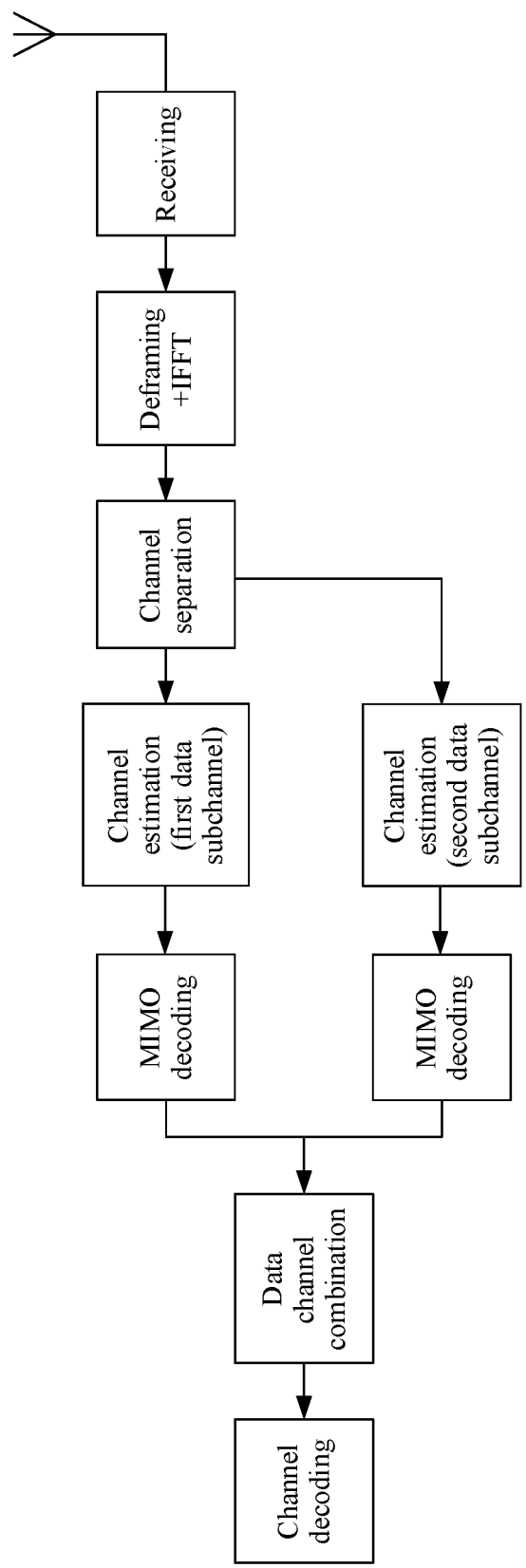
FIG. 8 is a processing flowchart of receiving a control channel and a data channel.

In the process shown in FIG. 8, for specific processing processes such as deframing+IFFT, channel separation, channel estimation, MIMO decoding, data channel combination, and channel decoding, refer to existing processes. Details are not described.

According to the method shown in FIG. 5, when the data channel is divided into the first data subchannel and the second data subchannel, the first data subchannel and the control channel overlap in time domain and do not overlap in frequency domain, and the second data subchannel and the control channel overlap in frequency domain and do not overlap in time domain, the transmit power of the second data subchannel may be determined to be the same as the transmit power of the control channel and the first data subchannel, the control channel and the first data subchannel are sent to the second terminal apparatus at the transmit power of the control channel and the first data subchannel, and the second data subchannel is sent to the second terminal apparatus at the transmit power of the control channel and the first data subchannel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

The following uses a schematic diagram, shown in FIG. 6a, of a multiplexing relationship between the control channel and the data channel as an example to describe how the first terminal apparatus determines the transmit power of the control channel, the transmit power of the first data subchannel, and the transmit power of the second data subchannel. For power control in other frame structures shown in FIG. 6b to FIG. 6f, refer to the following descriptions. Details are not described one by one.

1. Transmit Power of the Control Channel:

In some embodiments of this application, in the frame structure shown in FIG. 6a, the control channel and the first data subchannel have a same time domain position, so that when the control channel and the first data subchannel are transmitted on the same time domain position, power allocation needs to be performed between the control channel and the first data subchannel. In view of this, the first terminal apparatus may determine the transmit power of the control channel based on the maximum transmit power $P_{CMAX}$, the bandwidth M−N of the first data subchannel, and the bandwidth N of the control channel. More specifically, the transmit power of the control channel may satisfy the following formula (9):

$$P_{control} = \min\{P_{CMAX} - f(M-N, N), f(N) + P_O + \alpha \cdot PL\}[\text{dBm}]. \tag{9}$$

$P_{control}$ is the transmit power of the control channel, $P_{CMAX}$ is the maximum transmit power, $f(M-N,N)$ is a function of the bandwidth M−N of the first data subchannel and the bandwidth N of the control channel, $f(N)$ is a function of the bandwidth N of the control channel, $P_O$ is a target receive power (which may also be understood as an expected receive power of the second terminal apparatus) of the second terminal apparatus, and a unit of $P_O$ is dBm. α is a link loss compensation coefficient set (by a base station) for stability adjustment and may be configured at a higher layer, PL is a reference link loss, PL is a positive number, and a unit of PL is dB.

For specific descriptions of PL, refer to the current technology. Details are not described herein. Specifically, $P_{CMAX}$ may be understood as a maximum transmit power limited by physical hardware, or may be understood as a maximum transmit power allowed by hardware of the terminal device. Optionally, $P_{CMAX}$ may be configured by using higher layer signaling of the base station.

It may be understood that $f(M-N, N)$ in the formula (9) may also be understood as an expression of the bandwidth M−N of the first data subchannel and the bandwidth N of the control channel, or may also be understood as a relation of the bandwidth M−N of the first data subchannel and the bandwidth N of the control channel, or the like.

In the formula (9), $P_{CMAX}-f(M-N,N)$ may be understood as a transmit power allocated to the control channel based on the maximum transmit power $P_{CMAX}$ and a bandwidth proportion of the control channel and the first data subchannel, and $f(N)+P_O+\alpha \cdot PL$ may be understood as a link budget of the control channel, a link-required transmit power of the control channel, an expected link transmit power of the control channel, or the like.

Specifically, $f(M-N, N)$ may satisfy the following formula (10):

$$f(M-N, N) = 10\log_{10}\left(1 + \frac{M-N}{10^{\frac{3}{10}} \times N}\right)[\text{dBm}]. \tag{10}$$

In other words, because the control channel and the first data subchannel overlap in time domain but do not overlap in frequency domain, the control channel and the first data subchannel are respectively used to send control information and data at a same moment. Therefore, power allocation needs to be performed between the control channel and the first data subchannel. Therefore, $f(M-N, N)$ may be understood as a power allocation relationship between the control channel and the first data subchannel.

Specifically, $f(N)$ may satisfy the following formula (11):

$$f(N) = 10\log_{10}\left(10^{\frac{3}{10}} \times N\right)[dBm]. \tag{11}$$

Further, with reference to the formula (10) and the formula (11), the transmit power of the control channel may satisfy the following formula (12):

$$P_{control} = \min \left\{ P_{CMAX} - 10\log_{10}\left(1 + \frac{M-N}{10^{\frac{3}{10}} \times N}\right), 10\log_{10}\left(10^{\frac{3}{10}} \times N\right) + P_O + \alpha \cdot PL \right\} [\text{dBm}]. \quad (12)$$

Alternatively, the embodiments further provide another form to indicate the transmit power of the control channel, as shown in the following formula (13):

$$P_{control} = 10\log_{10}\left(\frac{10^{\frac{3}{10}} \times N}{M - N + 10^{\frac{3}{10}} \times N}\right) + \min\left\{P_{CMAX}, 10\log_{10}\left(M - N \times 10^{\frac{3}{10}} \times N\right) + P_O + \alpha \cdot PL\right\} [\text{dBm}]. \quad (13)$$

It may be understood that the formula (12) and the formula (13) are equivalent, and are two different forms of the transmit power of the control channel in a base station scheduling mode. When the first terminal apparatus needs to determine the transmit power of the control channel, results of the transmit power of the control channel that are determined by the first terminal apparatus separately according to the formula (12) and the formula (13) are consistent. Therefore, the first terminal apparatus may further determine the transmit power of the control channel according to the formula (9) and further according to the formula (12) or the formula (13).

The foregoing formula (9), formula (12), and formula (13) that the control channel satisfies are shown in the base station scheduling mode. However, in a contention mode, because each subchannel has a busy power control setting, in some embodiments of this application, the transmit power of the control channel may satisfy the following formula:

$$P_{control} = \min\{P_{CMAX} - f(M-N, N), f(N) + P_O + \alpha \cdot PL, P_{MAX\_CC} - f(M-N, N)\}[\text{dBm}]. \quad (14)$$

As described above, $P_{control}$ is the transmit power of the control channel, $P_{CMAX}$ is the maximum transmit power, $f(M-N, N)$ is a function of the bandwidth M−N of the first data subchannel and the bandwidth N of the control channel, $f(N)$ is a function of the bandwidth N of the control channel, $P_O$ is a target receive power of the second terminal apparatus, $\alpha$ is a link loss compensation coefficient set for stability adjustment and may be configured at a higher layer, PL is a reference link loss, $P_{MAX\_CC}$ is a maximum transmit power that satisfies a congestion control requirement or may also be understood as a maximum channel busy power (max channel busy ratio).

$P_{MAX\_CC}$ is mainly used for congestion control, and an objective is to reduce a maximum transmit power of a sending user or set a maximum transmit power of the user in a current busy degree when the busy degree of a system exceeds a specific limit.

Further, with reference to the formula (10) and the formula (11), in the contention mode, the transmit power of the control channel may satisfy the following formula (15):

$$P_{control} = \min \left\{ P_{CMAX} - 10\log_{10}\left(1 + \frac{M-N}{10^{\frac{3}{10}} \times N}\right), 10\log_{10}\left(10^{\frac{3}{10}} \times N\right) + P_O + \alpha \cdot PL, \right. \\ \left. P_{MAX\_CC} - 10\log_{10}\left(1 + \frac{M-N}{10^{\frac{3}{10}} \times N}\right) \right\} [\text{dBm}]. \quad (15)$$

Alternatively, in the contention mode, the transmit power of the control channel satisfies the following formula:

$$P_{control} = 10\log_{10}\left(\frac{10^{\frac{3}{10}} \times N}{M - N + 10^{\frac{3}{10}} \times N}\right) + \min\left\{P_{CMAX}, 10\log_{10}\left(M - N + 10^{\frac{3}{10}} \times N\right) + P_O + \alpha \cdot PL, P_{MAX\_CC}\right\} [\text{dBm}]. \quad (16)$$

It may be understood that the formula (15) and the formula (16) are two different forms of the transmit power of the control channel, and transmit powers of the control channel that are determined by the first terminal apparatus separately according to the formula (15) and the formula (16) are consistent.

It may be understood that, in the foregoing embodiments, the transmit power of the control channel may have another variation. Therefore, the foregoing embodiments should not be construed as limitations on this application.

2. Transmit Power of the First Data Subchannel:

In some embodiments of this application, the transmit power of the first data subchannel may be determined based on the maximum transmit power $P_{CMAX}$, the bandwidth M−N of the first data subchannel, and the bandwidth N of the control channel.

More specifically, the transmit power of the first data subchannel may satisfy the following formula (17):

$$P_{DATA\_A} = \min\{P_{CMAX} - f(N, M-N), f(M-N) + P_O + \alpha \cdot PL\}[\text{dBm}]. \quad (17)$$

As described above, $P_{CMAX}$ is the maximum transmit power, $f(N, M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_O$ is a target receive power of the second terminal apparatus, PL is a reference link loss, PL is a positive number, $\alpha$ is a link loss compensation coefficient, and $\alpha$ is greater than 0 and less than 1.

It may be understood that $f(N, M-N)$ may also be understood as an expression, a relation, or the like of the bandwidth M−N of the first data subchannel and the bandwidth N of the control channel, and $f(M-N)$ may also be understood as an expression, a relation, or the like of the bandwidth M−N of the first data subchannel.

$P_{CMAX} - f(N, M-N)$ may be understood as a transmit power allocated to the first data subchannel based on the maximum transmit power $P_{CMAX}$ and a bandwidth proportion of the first data subchannel and the control channel, and $f(M-N)+P_O+\alpha \cdot PL$ may be understood as a link budget of the first data subchannel.

Specifically, $f(N,M-N)$ satisfies the following formula (18):

$$f(N, M-N) = 10\log_{10}\left(1 + 10^{\frac{3}{10}} \times \frac{N}{M-N}\right) [dBm]. \quad (18)$$

Specifically, $f(M-N)$ satisfies the following formula (19):

$$f(M-N) = 10\log_{10}(M-N)[dBm] \quad (19)$$

Further, with reference to the formula (18) and the formula (19), the transmit power of the first data subchannel may satisfy the following formula (20):

$$P_{DATA\_A} = \min\left\{P_{CMAX} - 10\log_{10}\left(1 + 10^{\frac{3}{10}} \times \frac{N}{M-N}\right), 10\log_{10}(M-N) + P_O + \alpha \cdot PL\right\}[dBm]. \quad (20)$$

Alternatively, the embodiments further provide another form to indicate the transmit power of the first data subchannel, as shown in the following formula (21):

$$P_{DATA\_A} = 10\log_{10}\left(\frac{M-N}{M-N+10^{\frac{3}{10}} \times N}\right) + \min\left\{P_{CMAX}, 10\log_{10}\left(M-N+10^{\frac{3}{10}} \times N\right) + P_O + \alpha \cdot PL\right\}[dBm]. \quad (21)$$

The formula (20) and the formula (21) are two different forms of the transmit power of the first data subchannel, and transmit powers of the first data subchannel that are determined by the first terminal apparatus separately according to the formula (20) and the formula (21) are consistent.

The foregoing formula (17), formula (20), and formula (21) that the first data subchannel satisfies are shown in a base station scheduling mode. However, in a contention mode, because each subchannel has a busy power control setting, in some embodiments of this application, the transmit power of the first data subchannel may satisfy the following formula (22):

$$P_{DATA\_A} = \quad (22)$$
$$\min\{P_{CMAX} - f(N, M-N), f(M-N) + P_O + \alpha \cdot PL, P_{MAX\_CC} - f(N, M-N)\}[dBm].$$

$P_{MAX\_CC}$ is a maximum transmit power that satisfies the congestion control requirement. It may be understood that $P_{MAX\_CC}$ in the formula (17) and the formula (22) may be understood as a same maximum transmit power that satisfies the congestion control requirement.

Further, with reference to the formula (18) and the formula (19), in the contention mode, the transmit power of the first data subchannel satisfies the following formula (23):

$$P_{DATA\_A} = \min \quad (23)$$
$$\left\{P_{CMAX} - 10\log_{10}\left(1 + 10^{\frac{3}{10}} \times \frac{N}{M-N}\right), 10\log_{10}(M-N) + P_O + \alpha \cdot PL, P_{MAX\_CC} - 10\log_{10}\left(1 + 10^{\frac{3}{10}} \times \frac{N}{M-N}\right)\right\}[dBm].$$

Alternatively, in the contention mode, the transmit power of the first data subchannel satisfies the following formula (24):

$$P_{DATA\_A} = 10\log_{10}\left(\frac{M-N}{M-N+10^{\frac{3}{10}} \times N}\right) + \min \quad (24)$$
$$\left\{P_{CMAX}, 10\log_{10}\left(M-N+10^{\frac{3}{10}} \times N\right) + P_O + \alpha \cdot PL, P_{MAX\_CC}\right\}[dBm].$$

The formula (23) and the formula (24) are two different forms of the transmit power of the first data subchannel in the contention mode, and transmit powers of the first data subchannel that are determined by the first terminal apparatus separately according to the formula (23) and the formula (24) are consistent.

It may be understood that, for specific descriptions of the parameters in the formula (23) and the formula (24), correspondingly refer to the foregoing descriptions. Details are not described herein one by one. In addition, it may be understood that, in the foregoing embodiments, the transmit power of the first data subchannel may have another variation. Therefore, the foregoing embodiments should not be construed as limitations on this application.

3. Transmit Power of the Second Data Subchannel:

That the transmit power of the second data subchannel is $P_{DATA\_B}$ is used as an example, and $P_{DATA\_B}$ satisfies the following formula (25):

$$P_{DATA\_B} = P_{control} + P_{DATA\_A} \quad (25).$$

As described above, transmit powers of $P_{control}$ and $P_{DATA\_A}$ respectively satisfy the following formulas:

$$P_{DATA\_A} = \min\left\{P_{CMAX} - 10\log_{10}\left(1 + 10^{\frac{3}{10}} \times \frac{N}{M-N}\right), 10\log_{10}(M-N) + P_O + \alpha \cdot PL\right\}[dBm]; \text{ and}$$

$$P_{control} = \min\left\{P_{CMAX} - 10\log_{10}\left(1 + \frac{M-N}{10^{\frac{3}{10}} \times N}\right), 10\log_{10}\left(10^{\frac{3}{10}} \times N\right) + P_O + \alpha \cdot PL\right\}[dBm].$$

It is assumed that $$P_{allocation\_D\_A} = P_{CMAX} - 10\log_{10}\left(1 + 10^{\frac{3}{10}} \times \frac{N}{M-N}\right),$$

$$P_{r\_D\_A} = 10\log_{10}(M-N) + P_O + \alpha \cdot PL,$$

$$P_{allocation\_c} = P_{CMAX} - 10\log_{10}\left(1 + \frac{M-N}{10^{\frac{3}{10}} \times N}\right), \text{ and}$$

$$P_{r\_c} = 10\log_{10}\left(10^{\frac{3}{10}} \times N\right) + P_O + \alpha \cdot PL.$$

In this case, the formula (25) may be changed to the following formula (26):

$$P_{DATA\_B} = P_{control} + P_{DATA\_A} = \\ \min\{P_{allocation\_c}, P_{r\_c}\} + \min\{P_{allocation\_D\_A}, P_{r\_D\_A}\}. \quad (26)$$

In other words, the transmit power of the second data subchannel is equivalent to a combination of power allocation and a link requirement. A combination of the two min functions in the formula (26) may have the following possible cases:

1. $P_{allocation\_c} > P_{r\_c}$ & $P_{allocation\_D\_A} > P_{r\_D\_A}$;
2. $P_{allocation\_c} > P_{r\_c}$ & $P_{allocation\_D\_A} > P_{r\_D\_A}$;
3. $P_{allocation\_c} > P_{r\_c}$ & $P_{allocation\_D\_A} > P_{r\_D\_A}$; or
4. $P_{allocation\_c} > P_{r\_c}$ & $P_{allocation\_D\_A} > P_{r\_D\_A}$.

Through verification, the third possible case does not exist. Specifically, for a verification process, refer to the following descriptions. For the first possible case and the second possible case, both maximum items and minimum items in the two min functions are consistent. Therefore, the transmit power of the second data subchannel may also be represented by a smaller value of an allocated maximum transmit power and a link-required transmit power, that is, in a non-dB domain, the second data subchannel may be represented by the following formula (27):

$$P_{DATA\_B} = \min\{P_{allocation\_c} + P_{allocation\_D\_A}, P_{r\_c} + P_{r\_D\_A}\} \quad (27).$$

It is assumed that $P_{MAX} = 10 \log_{10}(\breve{P})$, where $\breve{P}$ represents a non-dB domain value of the maximum transmit power. In this case, $$P_{allocation\_c} = P_{CMAX} - 10\log_{10}\left(1 + 10^{-\frac{3}{10}} \times \frac{M-N}{N}\right) = \\ 10\log_{10}(\breve{P}) - 10\log_{10}\left(1 + \frac{M-N}{2N}\right) = 10\log_{10}\left(\frac{\breve{P} \times 2N}{M+N}\right)$$

Similarly, $P_{allocation\_D\_A} = P_{CMAX} - 10\log_{10}\left(1 + 10^{\frac{3}{10}} \times \frac{N}{M-N}\right) =$ $$10\log_{10}(\breve{P}) - 10\log_{10}\left(1 + \frac{2N}{M-N}\right) = 10\log_{10}\left(\frac{\breve{P} \times (M-N)}{M+N}\right)$$

Therefore, in the non-dB domain, the maximum transmit power allocated to the second data subchannel may be represented by a formula (28):

$$P_{allocation\_c} + P_{allocation\_D\_A} = \frac{\breve{P} \times 2N}{M+N} + \frac{\breve{P} \times (M-N)}{M+N} = \breve{P}. \quad (28)$$

In a dB domain, the maximum transmit power allocated to the second data subchannel may be represented by a formula (29):

$$P_{allocation\_c} + P_{allocation\_D\_A} = 10 \log_{10}(\breve{P}) = P_{CMAX} \quad (29).$$

Similarly, in the dB domain, the link-required transmit power of the second data subchannel may be represented by a formula (30):

$$P_{r\_c} + P_{r\_D\_A} = 10 \log_{10}(M-N+10^{3/10} \times N) + P_O + P_O + \alpha \cdot PL \quad (30).$$

It is assumed that PL and Po of the control channel and the data channel are the same. In this case, with reference to the formula (29) and the formula (30), finally, the transmit power of the second data subchannel may be represented by a formula (31):

$$P_{DATA\_B} = \min\left\{P_{CMAX}, 10\log_{10}\left(M - N + 10^{\frac{3}{10}} \times N\right) + P_O + \alpha \cdot PL\right\}. \quad (31)$$

In the foregoing descriptions, $$10^{\frac{3}{10}}$$

represents a power enhancement multiple of the control channel, that is, represents that the control channel has a power enhancement of 3 dB on each RE relative to the data channel. It should be noted that, in the embodiments of this application, the $$10^{\frac{3}{10}}$$

time enhancement is merely an example, and it indicates that the power of the control channel may be enhanced. In addition to $$10^{\frac{3}{10}},$$

another form of enhancement may alternatively be performed. This is not limited.

It should be noted that, in the foregoing design, it is assumed that the target receive powers $P_O$ and the reference link losses PL of the control channel and the data channel are the same. If the target receive powers $P_O$ and the reference link losses PL of the control channel and the data channel are different, the foregoing formula (29) and formula (30) cannot be combined. In this case, in the non-dB domain, the transmit power of the second data subchannel may be represented only by a formula (26).

It should be noted that the transmit power of the control channel, the transmit power of the first data subchannel, or the transmit power of the second data subchannel described in the embodiment shown in FIG. 5 refers to a transmit power at a moment or in a time unit.

The following is a process to prove the third possible case: $P_{allocation\_c} > P_{r\_c}$ & $P_{allocation\_D\_A} > P_{r\_D\_A}$; or to prove that $P_{allocation\_c} < P_{r\_c}$ & $P_{allocation\_D\_A} > P_{r\_D\_A}$ does not exist.

First, it is assumed that $P_{allocation\_c} > P_{r\_c}$. In this case, $$P_{allocation\_c} = \\ P_{CMAX} - 10\log_{10}\left(1 + 10^{-\frac{3}{10}} \times \frac{M-N}{N}\right) = P_{CMAX} - 10\log_{10}\left(\frac{M+N}{2N}\right) =$$

-continued $$P_{CMAX} + 10\log_{10}\left(\frac{2N}{M+N}\right) = P_{CMAX} + 10\log_{10}\left(\frac{M-N}{M+N} * \frac{2N}{M-N}\right) =$$

$$P_{CMAX} - 10\log_{10}\left(\frac{M+N}{M-N}\right) + 10\log_{10}\left(\frac{2N}{M-N}\right) =$$

$$P_{CMAX} - 10\log_{10}\left(1 + \frac{2N}{M-N}\right) + 10\log_{10}\left(\frac{2N}{M-N}\right)$$

Correspondingly, the formula $P_{allocation\_c} > P_{r\_c}$ is transformed into:

$$P_{CMAX} - 10\log_{10}\left(1 + \frac{2N}{M-N}\right) + 10\log_{10}\left(\frac{2N}{M-N}\right) >$$

$$10\log_{10}\left(10^{\frac{3}{10}} \times N\right) + P_O + \alpha \cdot PL.$$

That is, $$P_{CMAX} - 10\log_{10}\left(1 + \frac{2N}{M-N}\right) >$$

$$-10\log_{10}\left(\frac{2N}{M-N}\right) + 10\log_{10}\left(10^{\frac{3}{10}} \times N\right) + P_O + \alpha \cdot PL;$$

and then $$P_{CMAX} - 10\log_{10}\left(1 + \frac{2N}{M-N}\right) > 10\log_{10}(M-N) + P_O + \alpha \cdot PL.$$

That is, $P_{allocation\_D\_A} > P_{r\_D\_A}$.

It can be learned from the foregoing proof process: When $P_{allocation\_c} > P_{r\_c}$, $P_{allocation\_D\_A} > P_{r\_D\_A}$ is true.

Similarly, when $P_{allocation\_c} < P_{r\_c}$, $P_{allocation\_D\_A} < P_{r\_D\_A}$ is true. Therefore, it can be learned from the foregoing proof process:

$P_{allocation\_c} > P_{r\_c}$ & $P_{allocation\_D\_A} < P_{r\_D\_A}$, or $P_{allocation\_c} < P_{r\_c} > P_{allocation\_D\_A} > P_{r\_D\_A}$ does not exist.

The foregoing embodiment describes the power control method for the option 3. The following describes the power control method for the option 1a frame structure and the option 1b frame structure with reference to a method shown in FIG. 9.

Figure 9:
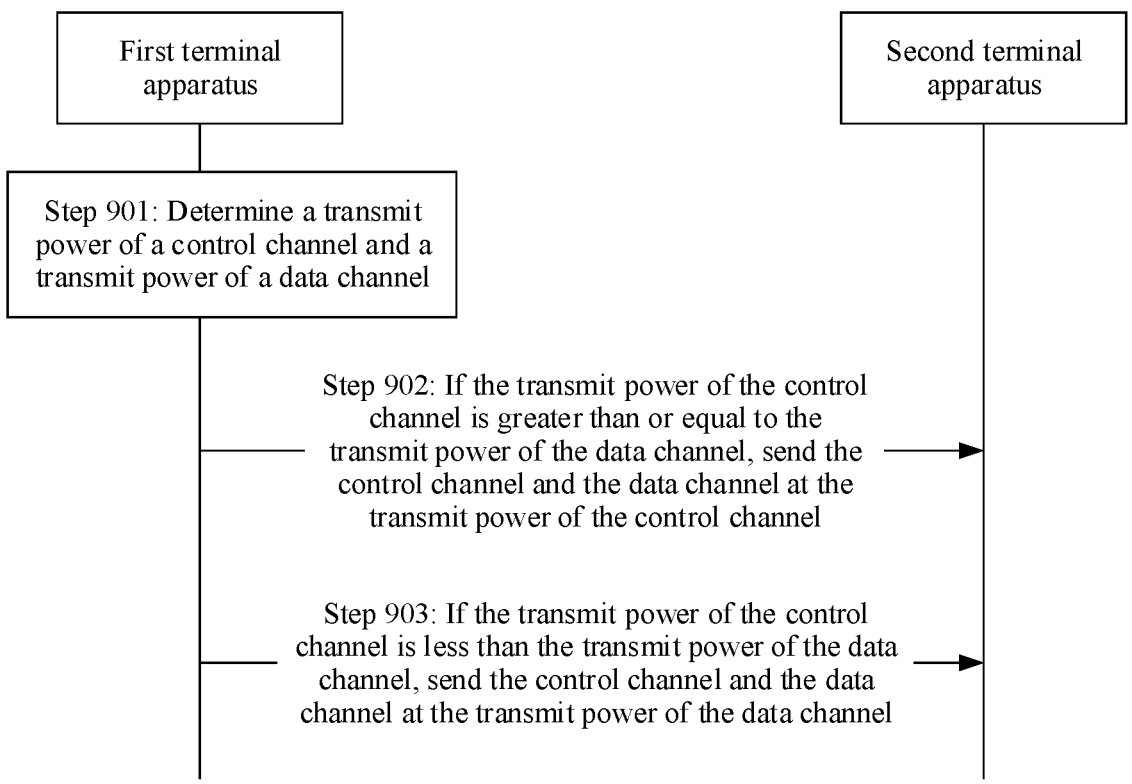
FIG. 9 is a flowchart of a power control method according to an embodiment of this application.

FIG. 9 shows another power control method according to an embodiment of this application. The method is used to perform power control on the data channel and the control channel in the option 1a frame structure and the option 1b frame structure. As shown in FIG. 9, the method may include the following steps.

Step 901: A first terminal apparatus determines a transmit power of the control channel and a transmit power of the data channel; and if the transmit power of the control channel is greater than or equal to the transmit power of the data channel, performs step 902; or if the transmit power of the control channel is less than the transmit power of the data channel, performs step 903.

The first terminal apparatus may be any terminal device in the system shown in FIG. 3.

The control channel and the data channel may overlap in frequency domain and not overlap in time domain. For example, a multiplexing relationship between the control channel and the data channel may be shown in the option 1a or the option 1b in FIG. 4.

Figure 10A:
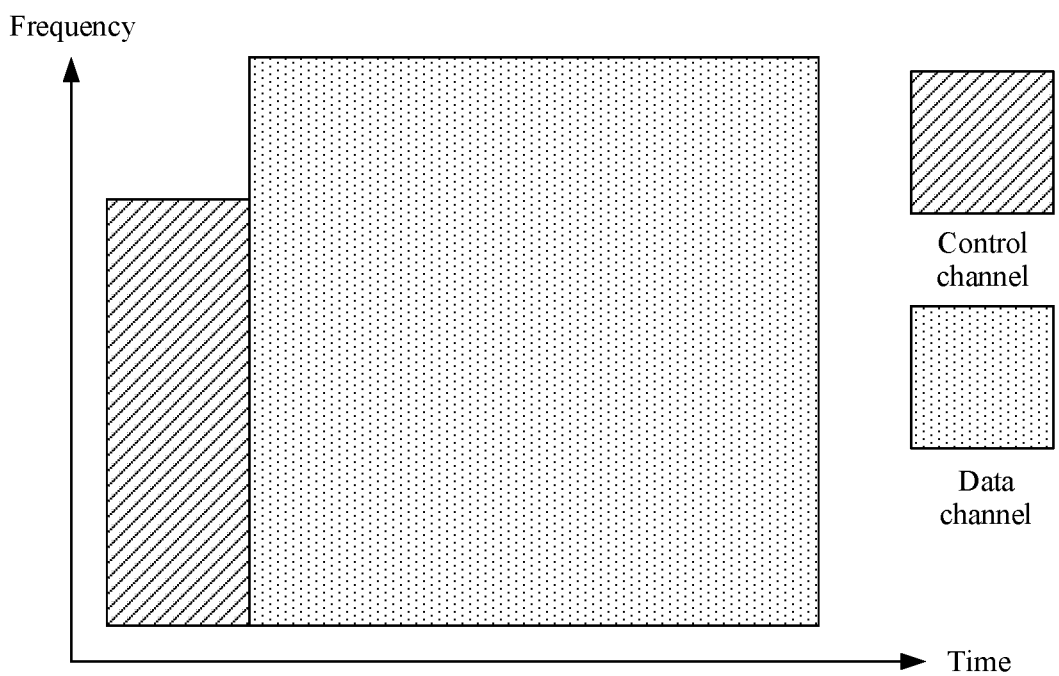
FIG. 10a is a schematic diagram of a data channel and a control channel according to an embodiment of this application.

To more vividly understand the option 1a frame structure and the option 1b frame structure in FIG. 4 that are described in the embodiments of this application, FIG. 10a to FIG. 10d provide several possible structures in which the data channel and the control channel overlap in frequency domain and do not overlap in time domain. FIG. 10a is used as an example. As shown in FIG. 10a, the data channel and the control channel overlap in frequency domain but do not overlap in time domain.

For example, a bandwidth of the data channel is M, a bandwidth of the control channel is N, and M may be greater than or equal to N. It may be understood that M may represent M resource units, and N may represent N resource units. The resource unit may be an RB, a subcarrier, or a resource unit at another granularity. This is not limited. That the resource unit is the RB is used as an example. In this embodiment of this application, M may represent M RBs, and N may represent N RBs.

Figure 10B:
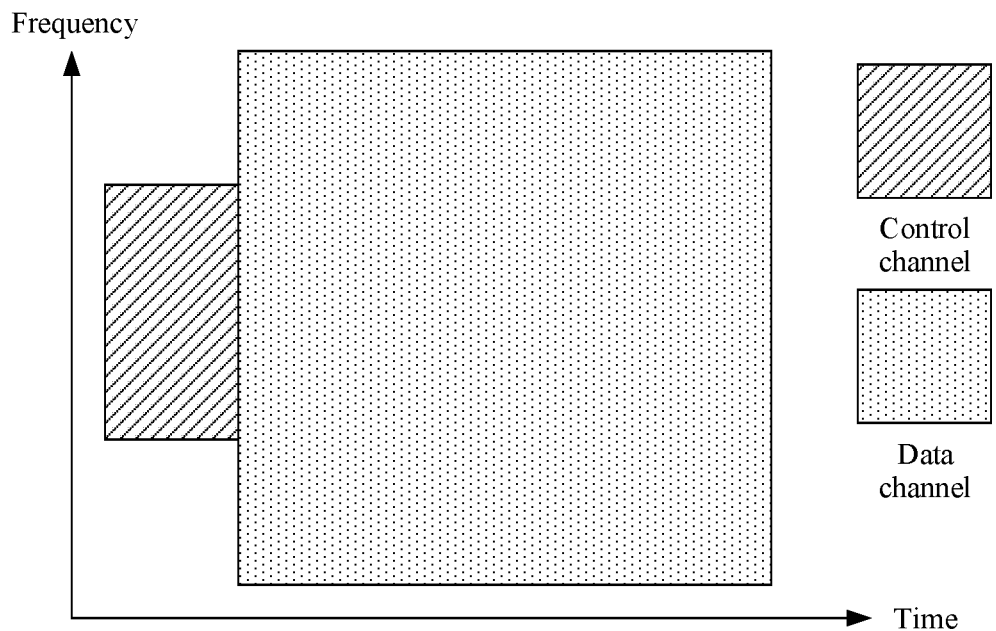
FIG. 10b is another schematic diagram of a data channel and a control channel according to an embodiment of this application.
Figure 10C:
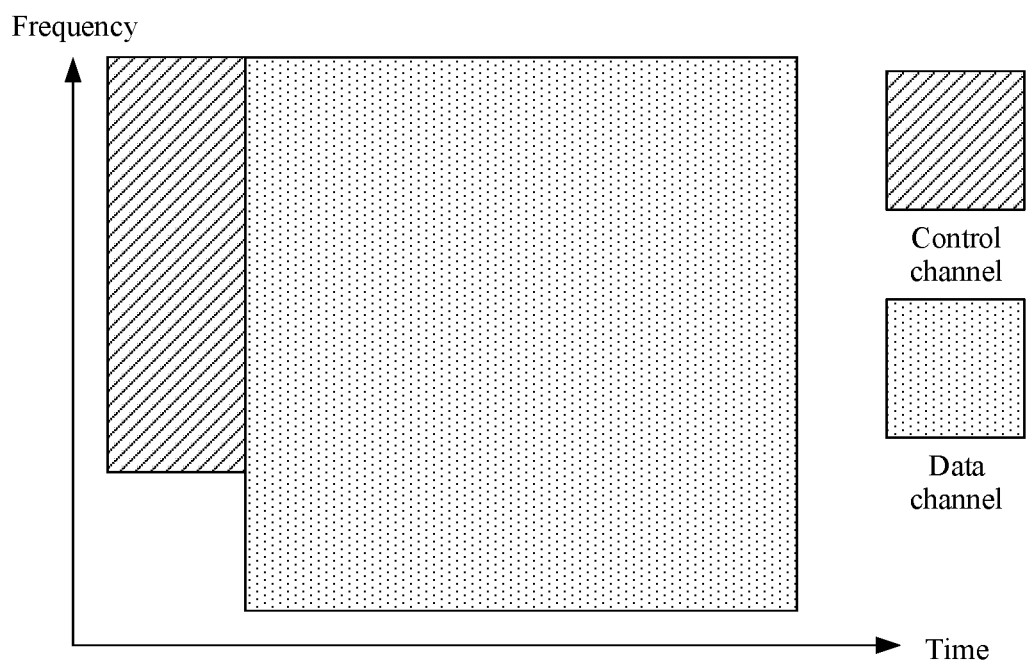
FIG. 10c is still another schematic diagram of a data channel and a control channel according to an embodiment of this application.
Figure 10D:
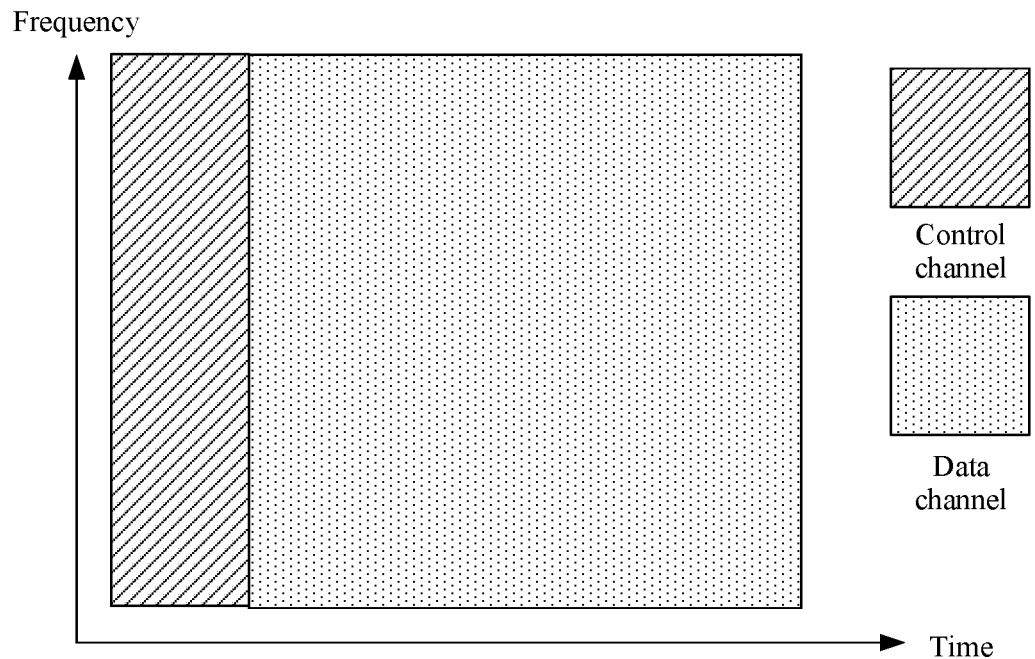
FIG. 10d is still another schematic diagram of a data channel and a control channel according to an embodiment of this application.

It may be understood that, for a schematic diagram of the data channel and the control channel, refer to schematic diagrams shown in FIG. 10b and FIG. 10c. Details are not described herein one by one.

For example, because the control channel and the data channel are time-division multiplexed, there is no power allocation problem, the data channel and the control channel may independently use the entire power, and no power allocation is performed. For example, the transmit power of the data channel may be determined in a maximum transmit power and a link budget of the data channel. Similarly, the transmit power of the data channel may be determined in the maximum transmit power and the link budget of the data channel.

Specifically, the transmit power of the control channel may satisfy the following formula (32):

$$P_{control} = \min\{P_{CMAX}, f(N) + P_O + \alpha \cdot PL\}[dBm] \tag{32}$$

The transmit power of the data channel may satisfy the following formula (33):

$$P_{DATA} = \min\{P_{CMAX}, f(M) + P_O + \alpha \cdot PL\}[dBm] \tag{33}$$

$P_{control}$ is the transmit power of the control channel, $P_{DATA}$ is the transmit power of the control channel, $P_{CMAX}$ is the maximum transmit power, $f(M)$ is a function of the bandwidth M of the data channel, $f(N)$ is a function of the bandwidth N of the control channel, $P_O$ is a target receive power (which may also be understood as an expected receive power of a second terminal apparatus) of the second terminal apparatus, and a unit of $P_O$ is dBm. $\alpha$ is a link loss compensation coefficient set (by a base station) for stability adjustment and may be configured at a higher layer, PL is a reference link loss, PL is a positive number, and a unit of PL is dB.

It may be understood that $f(M)$ in the formula (33) may also be understood as an expression of the bandwidth M of the data channel, or may also be understood as a relation of the bandwidth M of the data channel, or the like.

Specifically, $f(M)$ may satisfy the following formula (34):

$$f(M) = 10 \log_{10}(M)[dBm] \tag{34}$$

$f(N)$ may satisfy the following formula (35):

$$f(N) = 10\log_{10}\left(10^{\frac{3}{10}} \times N\right)[dBm]. \tag{35}$$

Further, with reference to the formula (35), the transmit power of the control channel may satisfy the following formula (36):

$$P_{control} = \min\{P_{CMAX}, 10\log_{10}(10^{\frac{3}{10}} \times N) + P_O + \alpha \cdot PL\}[dBm]. \quad (36)$$

With reference to the formula (34), the transmit power of the data channel may satisfy the following formula (37):

$$P_{DATA} = \min\{P_{CMAX}, 10\log_{10}(M) + P_O + \alpha \cdot PL\}[dBm] \quad (37).$$

In order to achieve an objective that a same transmit power is used on all symbols in a time unit (for example, a transmission time interval (TTI)), a larger value of the two transmit powers of the control channel and the data channel may be used. Through observation of the foregoing formula (36) and formula (36), there are two possible cases.

In a first possible case, compared with the second item in the formula of the transmit power of the data channel, the second item in the formula of the transmit power of the control channel is larger, that is, a link-required transmit power of the control channel is larger, and $10^{3/10} \times N > M$. To keep consistency of a transmit power in an entire time unit, in a possible design, the control channel and the data channel are sent at the transmit power of the control channel, that is, the transmit power of the control channel and the transmit power of the data channel finally satisfy the following formula (38):

$$P_{PSCCH} = \quad (38)$$
$$P_{PSSCH} = \min\{P_{CMAX}, 10\log_{10}(10^{\frac{3}{10}} \times N) + P_O + \alpha \cdot PL\}[dBm].$$

In a second possible case, compared with the second item in the formula of the transmit power of the control channel, the second item in the formula of the transmit power of the data channel is larger, that is, a link-required transmit power of the data channel is larger, and $10^{3/10} \times N < M$. To keep consistency of a transmit power in an entire time unit, in another possible design, the control channel and the data channel are sent at the transmit power of the data channel, that is, the transmit power of the control channel and the transmit power of the data channel finally satisfy the following formula (40):

$$P_{PSCCH} = P_{PSSCH} = \min\{P_{CMAX}, 10\log_{10}(M) + P_O + \alpha \cdot PL\}[dBm]. \quad (40)$$

Similarly, it is assumed that the target receive powers $P_O$ and the reference link losses PL of the control channel and the data channel are the same. In this case, the determined transmit powers of the control channel and the data channel finally have the following two cases:

$$P_{PSCCH} = P_{PSSCH} =$$
$$\begin{cases} \min\{P_{CMAX}, 10\log_{10}(10^{\frac{3}{10}} \times N) + P_O + \alpha \cdot PL\} & \text{when } 10^{\frac{3}{10}} \times N > M \\ \min\{P_{CMAX}, 10\log_{10}(M) + P_O + \alpha \cdot PL\} & \text{when } 10^{\frac{3}{10}} \times N < M. \end{cases}$$

$10^{\frac{3}{10}}$ indicates that the power of the control channel is enhanced compared with the data channel. Herein, $$10^{\frac{3}{10}}$$

only indicates that the target power of the control channel may be enhanced by 3 dB, and another form of enhancement may also be performed. This is only applicable to the present example, and is not specifically protected in the present disclosure. However, in this embodiment, when $$10^{\frac{3}{10}} \times N < M,$$

the transmit power of the data channel is used, and a result may be that the output power of the control channel may be enhanced by more than 3 dB.

It should be noted that the foregoing solution is described in a case in which the target receive powers $P_O$ and the reference link losses PL of the control channel and the data channel are the same. If the target receive powers $P_O$ and the reference link losses PL of the control channel and the data channel are different, the determined transmit powers of the control channel and the data channel may be finally represented by:

$$P_{PSCCH} = P_{PSSCH} = \min\{P_{CMAX}, P_{R\_MAX}\}, \text{ where}$$
$$P_{R\_MAX} = \max\{10\log_{10}(M) + P_{DATA} + \alpha \cdot PL_{DATA},$$
$$10\log_{10}(M) + P_{control} + \alpha \cdot PL_{control}\}.$$

$P_{control}$ is the target receive power of the control channel, and $PL_{control}$ is the reference link loss of the control channel. $P_{DATA}$ is the target receive power of the data channel, and $PL_{DATA}$ is the reference link loss of the data channel.

Step 902: The first terminal apparatus sends the control channel and the data channel to the second terminal apparatus at the transmit power of the control channel.

Step 903: The first terminal apparatus sends the control channel and the data channel to the second terminal apparatus at the transmit power of the data channel.

Figure 7:
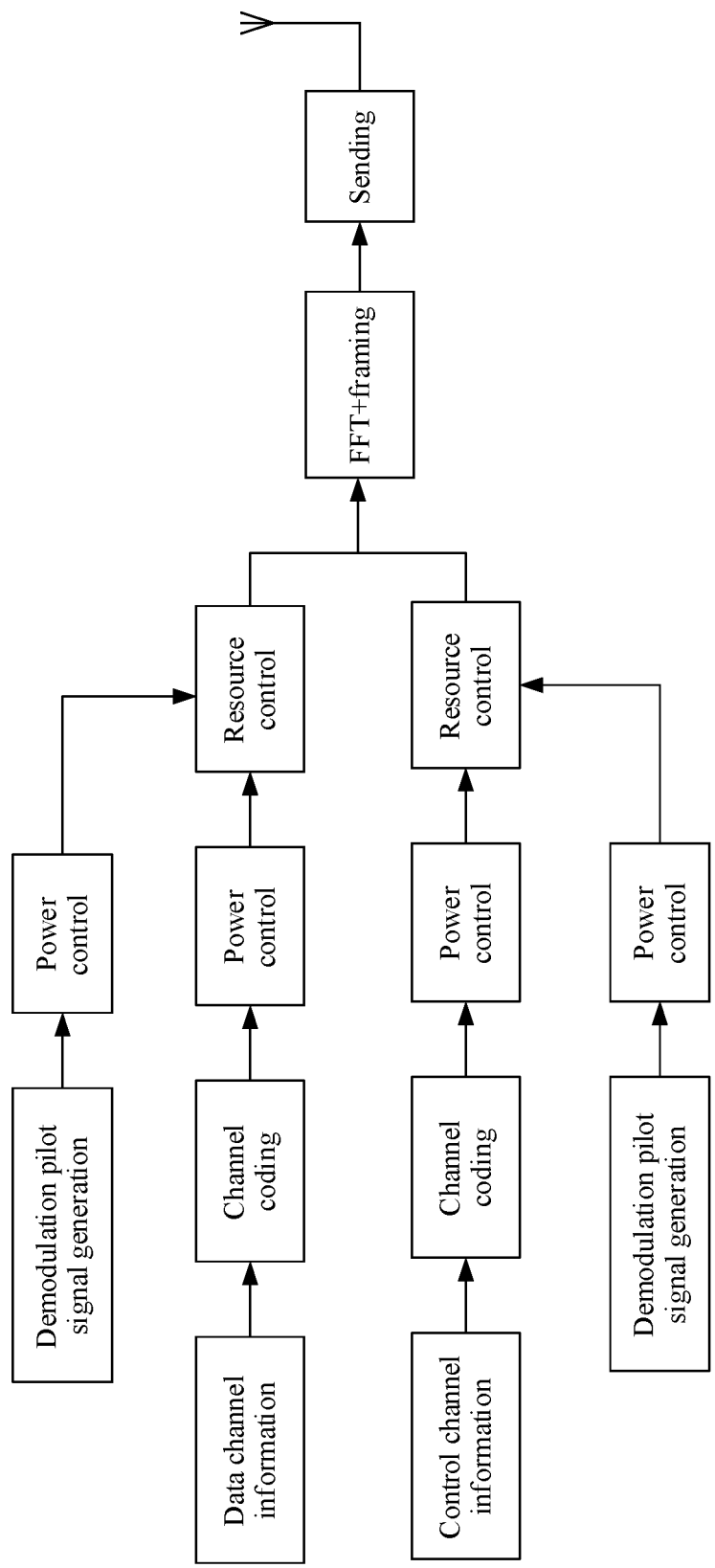
FIG. 7 is a processing flowchart of sending a control channel and a data channel.

The first terminal apparatus may send the control channel and the data channel to the second terminal apparatus at the transmit power of the control channel or send the control channel and the data channel to the second terminal apparatus at the transmit power of the data channel according to the sending procedure shown in FIG. 7.

It should be noted that the transmit power of the control channel or the transmit power of the data channel described in the embodiment shown in FIG. 9 refers to a transmit power at a moment or in a time unit.

According to the method shown in FIG. 9, when the data channel and the control channel overlap in frequency domain and do not overlap in time domain, the data channel and the control channel may be sent to the second terminal apparatus at a larger transmit power of the transmit power of the control channel and the transmit power of the data channel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

The foregoing mainly describes the solutions provided in the embodiments of this application from a perspective of the first terminal apparatus. It may be understood that to implement the foregoing functions, each node, such as the first terminal apparatus, includes a corresponding hardware structure and/or software module that is configured to perform each function. A person skilled in the art should be easily aware that, in combination with algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, function modules of the access network device and the terminal may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 11:
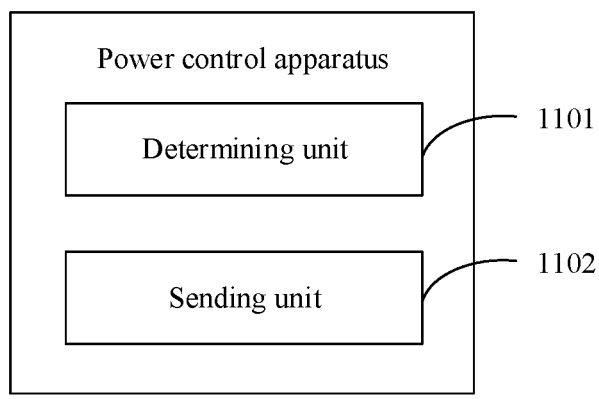
FIG. 11 is a schematic structural diagram of a power control apparatus according to an embodiment of this application.

FIG. 11 is a schematic structural diagram of a power control apparatus according to an embodiment of this application. The power control apparatus may be configured to perform the method described in the embodiments of this application. The power control apparatus may be a first terminal apparatus, or a chip or a system-on-a-chip in the first terminal apparatus. As shown in FIG. 11, in a possible design, the power control apparatus includes a determining unit 1101 and a sending unit 1102.

To perform power control in the option 3 frame structure, in an example 1, the determining unit 1101 is configured to: determine a transmit power of a control channel and a first data subchannel, where the control channel and the first data subchannel completely overlap in time domain and do not overlap in frequency domain; and determine that a transmit power of a second data subchannel is the same as the transmit power of the control channel and the first data subchannel, where the second data subchannel and the control channel overlap in frequency domain and do not overlap in time domain; and the sending unit 1102 is configured to: send the control channel and the first data subchannel to a second terminal apparatus at the transmit power of the control channel and the first data subchannel; and send the second data subchannel to the second terminal apparatus at the transmit power of the control channel and the first data subchannel.

In a possible design of the example 1, the determining unit 1101 is further configured to: before determining the transmit power of the control channel and the first data subchannel, determine the control channel and a data channel, where the data channel includes the first data subchannel and the second data subchannel. Based on this possible design, before the transmit power is determined, a frame structure of the control channel and the data channel may be determined as follows: The data channel is divided into the first data subchannel that overlaps the control channel in time domain and the second data subchannel that overlaps the control channel in frequency domain. Then, the transmit power of the control channel and the first data subchannel is determined based on the frame structure.

In another possible design of the example 1, a bandwidth of the second data subchannel is M, a bandwidth of the control channel is N, a bandwidth of the first data subchannel is M−N, M is greater than N, and N is a positive integer; and the determining unit 1101 is specifically configured to: determine a transmit power $P_{control}$ of the control channel and a transmit power $P_{DATA\_A}$ of the first data subchannel based on a maximum transmit power, the bandwidth N of the control channel, and the bandwidth M−N of the first data subchannel; and use $P_{control}+P_{DATA\_A}$ as the transmit power of the control channel and the first data subchannel and as the transmit power of the second data subchannel.

In another possible design of the example 1, the transmit power $P_{control}$ of the control channel satisfies the following formula: $P_{control}=\min\{P_{CMAX}-f(N,M-N), f(N)+P_O+\alpha \cdot PL\}$; and the transmit power of the first data subchannel satisfies the following formula: $P_{DATA\_A}=\{P_{CMAX}-f(N,M-N), f(M-N)+P_O+\alpha \cdot PL\}$ where $P_{CMAX}$ is the maximum transmit power, $f(N,M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

In another possible design of the example 1, the transmit power of the control channel is:

$$P_{control}=\min\{P_{CMAX}-f(N,M-N), P_{MAX\_CC}-f(N,M-N), f(N)+P_O+\alpha \cdot PL\}; \text{ and}$$

the transmit power $P_{DATA\_A}$ of the first data subchannel satisfies the following formula:

$$P_{DATA\_A}=\min\{P_{CMAX}-f(N,M-N), P_{MAX\_CC}-f(N,M-N), f(M-N)+P_O+\alpha \cdot PL\},$$

where $P_{CMAX}$ is the maximum transmit power, $P_{MAX\_CC}$ is a maximum transmit power that satisfies a congestion control requirement, $f(N,M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

Based on the example 1, when the data channel is divided into the first data subchannel and the second data subchannel, the first data subchannel and the control channel overlap in time domain and do not overlap in frequency domain, and the second data subchannel and the control channel overlap in frequency domain and do not overlap in time domain, the transmit power of the second data subchannel may be determined to be the same as the transmit power of the control channel and the first data subchannel, the control channel and the first data subchannel are sent to the second terminal apparatus at the transmit power of the control channel and the first data subchannel, and the second data subchannel is sent to the second terminal apparatus at the transmit power of the control channel and the first data subchannel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

To perform power control in the option 1a frame structure and the option 1b frame structure, in an example 2, the determining unit 1101 is configured to: determine a transmit power of a control channel and a transmit power of a data channel that overlaps the control channel in frequency domain and that does not overlap the control channel in time domain; and the sending unit 1102 is configured to: when the transmit power of the control channel is greater than or equal to the transmit power of the data channel, send the control channel and the data channel to a second terminal apparatus at the transmit power of the control channel; or when the transmit power of the control channel is less than the transmit power of the data channel, send the control channel and the data channel to a second terminal apparatus at the transmit power of the data channel.

In a possible design of the example 2, a bandwidth of the control channel is N, a bandwidth of the data channel is M, M is greater than or equal to N, and N is a positive integer; and the determining unit 1101 is specifically configured to: determine the transmit power $P_{control}$ of the control channel based on a maximum transmit power and the bandwidth N of the control channel; and determine the transmit power $P_{DATA}$ of the data channel based on the maximum transmit power and the bandwidth M of the data channel.

With reference to the eighth aspect or any possible design of the eighth aspect, in another possible design of the example 2, the transmit power $P_{control}$ of the control channel satisfies the following formula: $P_{control}=\min\{P_{CMAX}, f(N)+P_O+\alpha \cdot PL\}$; and the transmit power $P_{DATA}$ of the data channel satisfies the following formula: $P_{DATA}=\min\{P_{CMAX}, f(M)+P_O+\alpha \cdot PL\}$, where $P_{CMAX}$ is the maximum transmit power, $f(N)$ is a function of the bandwidth N of the control channel, $f(M)$ is a function of the bandwidth M of the data channel, $P_O$ is a target receive power of the second terminal apparatus, PL is a reference link loss, PL is a positive number, $\alpha$ is a link loss compensation coefficient, and $\alpha$ is greater than 0 and less than 1.

Based on the example 2, when the data channel and the control channel overlap in frequency domain and do not overlap in time domain, the determining unit 1101 may send, through the sending unit 1102, the data channel and the control channel to the second terminal apparatus at a larger transmit power of the transmit power of the control channel and the transmit power of the data channel. In this way, it can be ensured that transmit powers on different symbols are the same, so that power amplification is performed on different symbols by using a same amplification factor. This avoids problems of transmission performance deterioration and a resource waste that are caused by switching an amplification factor of a radio frequency amplifier when transmit powers on different symbols are different, and improves system performance and resource utilization.

In another possible implementation, the power control apparatus shown in FIG. 11 may include a processing module and a communication module. The processing module may integrate functions of the determining unit 1101, and the communication module may integrate functions of the sending unit 1102. The processing module is configured to control and manage an action of the power control apparatus. For example, the processing module is configured to support the power control apparatus 110 in performing step 501, step 502, step 901, and another process of the technology described in this specification. The communication module is configured to support the power control apparatus in communicating with another network entity. For example, the communication module may be configured to support the power control apparatus in performing step 503, step 902, and step 903. Further, the power control apparatus shown in FIG. 11 may further include a storage module, configured to store program code and data that can be used to perform the power control method provided in this application.

The processing module may be a processor or a controller. The processing module may implement or execute various example logical blocks, modules, and circuits described with reference to content disclosed in this application. The processor may be a combination of processors implementing a computing function, for example, a combination of one or more microprocessors, or a combination of a digital signal processor (DSP) and a microprocessor. The communication module may be a transmitter, a transceiver circuit, a communication interface, a radio frequency link, or the like. The storage module may be a memory.

Figure 12:
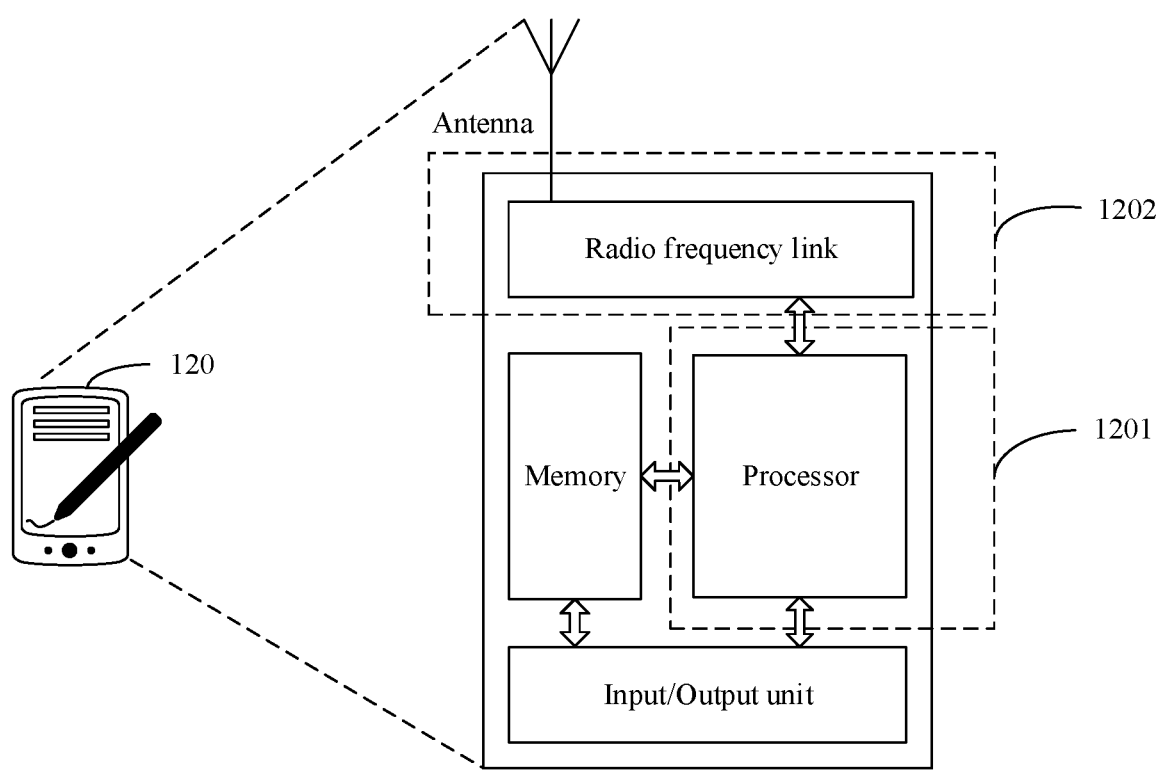
FIG. 12 is a schematic structural diagram of another power control apparatus according to an embodiment of this application.

FIG. 12 is a schematic structural diagram of a power control apparatus 120 according to an embodiment of this application. The power control apparatus may be configured to perform the method described in the embodiments of this application. The power control apparatus may be a first terminal apparatus, or a chip or a system-on-a-chip in the first terminal apparatus. FIG. 12 is a schematic composition diagram of the power control apparatus 120 according to this embodiment of this application. As shown in FIG. 12, the power control apparatus 120 may include at least one processor 1201, a radio frequency link 1202, an antenna, a memory, and the like.

The processor 1201 is mainly configured to: process a communication protocol and communication data; control the entire first terminal apparatus; execute a software program; and process data of the software program. For example, the processor 1201 is configured to support the power control apparatus 120 in performing the procedures shown in FIG. 5 and FIG. 9. The processor 1201 may include a baseband processor and a central processing unit (CPU). The baseband processor is mainly configured to process the communication protocol and the communication data. The CPU is mainly configured to control the entire first terminal apparatus, execute the software program, and process the data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The radio frequency link 1202 is mainly configured to perform conversion between a baseband signal and a radio frequency signal and processing of the radio frequency signal, and may be configured to communicate with another device or communication network (for example, the Ethernet, a radio access network (RAN), or a wireless local area network (WLAN)). The radio frequency link 1202 may be a module, a circuit, a transceiver, or any apparatus that can implement communication.

The antenna is mainly configured to receive and send a radio frequency signal in a form of an electromagnetic wave.

The memory may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer, but is not limited thereto. In a possible design, the memory may be independent of the processor 1201. To be specific, the memory may be a memory outside the processor 1201. In this case, the memory may be connected to the processor 1201 through a communication line, and is configured to store instructions or program code. When invoking and executing the instructions or the program code stored in the memory, the processor 1201 can implement the communication method provided in the following embodiment of this application. In another possible design, the memory may alternatively be integrated with the processor 1201. To be specific, the memory may be an internal memory of the processor 1201. For example, the memory is a cache, and may be configured to temporarily store some data, instruction information, and/or the like.

In an example, the processor 1201 may include one or more CPUs. In another possible implementation, the power control apparatus 120 may include a plurality of processors. In still another possible implementation, the power control apparatus 120 may further include an input/output unit. For example, the input/output unit, for example, a keyboard, a mouse, a microphone or a joystick, a touchscreen, a display screen, or a keyboard, is mainly configured to receive data input by a user and output data to the user. It should be noted that some types of first terminal apparatuses may have no input/output apparatus.

After the power control apparatus 120 starts to work, the processor 1201 may read the software program in the storage unit, and explain and execute the software program. For example, when a control channel and a data channel need to be sent to a second terminal apparatus, the processor 1201 may perform baseband processing on the control channel and the data channel, and output a baseband signal to the radio frequency link. After performing radio frequency processing on the baseband signal, the radio frequency link sends a radio frequency signal in a form of an electromagnetic wave through the antenna.

For example, the processor 1201 may be configured to perform the methods shown in step 501 and step 502 shown in FIG. 5 and step 901 shown in FIG. 9. The radio frequency link 1202 may be configured to perform the methods shown in step 503 shown in FIG. 5 and step 902 and step 903 shown in FIG. 9. For example, to perform power control in the option 3 frame structure, the processor 1201 is configured to: determine a transmit power of a control channel and a first data subchannel, where the control channel and the first data subchannel completely overlap in time domain and do not overlap in frequency domain; and determine that a transmit power of a second data subchannel is the same as the transmit power of the control channel and the first data subchannel, where the second data subchannel and the control channel overlap in frequency domain and do not overlap in time domain; and the radio frequency link 1202 is configured to: send the control channel and the first data subchannel to a second terminal apparatus at the transmit power of the control channel and the first data subchannel; and send the second data subchannel to the second terminal apparatus at the transmit power of the control channel and the first data subchannel.

To perform power control in the option 1*a* frame structure and the option 1*b* frame structure, the processor 1201 is configured to: determine a transmit power of a control channel and a transmit power of a data channel that overlaps the control channel in frequency domain and that does not overlap the control channel in time domain; and the radio frequency link 1202 is configured to: when the transmit power of the control channel is greater than or equal to the transmit power of the data channel, send the control channel and the data channel to a second terminal apparatus at the transmit power of the control channel; or when the transmit power of the control channel is less than the transmit power of the data channel, send the control channel and the data channel to a second terminal apparatus at the transmit power of the data channel.

It may be understood that, for an implementation of the power control apparatus 120 shown in FIG. 12, specifically refer to the foregoing embodiments. Details are not described herein again.

It should be noted that the power control apparatus 120 may be a general-purpose device or a dedicated device. For example, the power control apparatus 120 may be a desktop computer, a portable computer, a network server, a mobile phone, a tablet computer, a wireless terminal, an embedded device, a chip system, or a device having a structure similar to that in FIG. 12. A type of the power control apparatus 120 is not limited in this embodiment of this application. In the embodiments of this application, the chip system may include a chip, or may include a chip and another discrete component. In addition, the device structure shown in FIG. 12 does not constitute a limitation on the power control apparatus. In addition to the components shown in FIG. 12, the power control apparatus 120 may include more or fewer components than those shown in the figure, or combine some components, or have different component arrangements.

An embodiment of this application further provides a computer-readable storage medium. All or some of the procedures of the method embodiments may be implemented by a computer program instructing related hardware. The program may be stored in the computer-readable storage medium. When the program is executed, the procedures of the method embodiments may be performed. The computer-readable storage medium may be an internal storage unit of the power control apparatus (including a data transmit end and/or a data receive end) in any one of the foregoing embodiments, for example, a hard disk or a memory of the power control apparatus. The computer-readable storage medium may alternatively be an external storage device of the power control apparatus, for example, a pluggable hard disk, a smart media card (SMC), a secure digital (SD) card, or a flash card disposed on the power control apparatus. Further, the computer-readable storage medium may alternatively include both the internal storage unit and the external storage device of the power control apparatus. The computer-readable storage medium is configured to store the foregoing computer program and other programs and data that are required by the power control apparatus. The computer-readable storage medium may be further configured to temporarily store data that has been output or is to be output.

It should be noted that, in the specification, claims, and accompanying drawings of this application, terms "first," "second," and the like are intended to distinguish between different objects but do not indicate a particular order. In addition, terms "include," "have," and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that in this application, "at least one (item)" means one or more, "a plurality of" means two or more, and "at least two (items)" means two, three, or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b," "a and c," "b and c," or "a, b, and c," where a, b, and c may be singular or plural.

Based on the foregoing descriptions of the implementations, a person skilled in the art may clearly understand that for the purpose of convenient and brief descriptions, division into the foregoing function modules is merely used as an example for illustration. During actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of the embodiments.

In addition, the function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A power control method, wherein the method comprises:
    determining, by a first terminal apparatus, a transmit power of a control channel and a first data subchannel, wherein the control channel and the first data subchannel completely overlap in time domain and do not overlap in frequency domain;
    determining, by the first terminal apparatus, that a transmit power of a second data subchannel is the same as the transmit power of the control channel and the first data subchannel, wherein the second data subchannel and the control channel overlap in frequency domain and do not overlap in time domain;
    sending, by the first terminal apparatus, the control channel and the first data subchannel to a second terminal apparatus at the transmit power of the control channel and the first data subchannel; and
    sending, by the first terminal apparatus, the second data subchannel to the second terminal apparatus at the transmit power of the control channel and the first data subchannel.

2. The method according to claim 1, wherein before the determining, by a first terminal apparatus, a transmit power of a control channel and a first data subchannel, the method further comprises:
    determining, by the first terminal apparatus, the control channel and a data channel, wherein the data channel comprises the first data subchannel and the second data subchannel.

3. The method according to claim 1, wherein a bandwidth of the second data subchannel is M, a bandwidth of the control channel is N, a bandwidth of the first data subchannel is M−N, M is greater than N, and N is a positive integer; and wherein the determining, by a first terminal apparatus, a transmit power of a control channel and a first data subchannel comprises:
    determining, by the first terminal apparatus, a transmit power $P_{control}$ of the control channel and a transmit power $P_{DATA\_A}$ of the first data subchannel based on a maximum transmit power, the bandwidth N of the control channel, and the bandwidth M−N of the first data subchannel; and using, by the first terminal apparatus, $P_{control}+P_{DATA\_A}$ as the transmit power of the control channel and the first data subchannel and as the transmit power of the second data subchannel.

4. The method according to claim 3, wherein the transmit power $P_{control}$ of the control channel satisfies the following formula:

$$P_{control} = \min\{P_{CMAX} - f(N, M - N), f(N) + P_O + \alpha \cdot PL\};$$

and wherein the transmit power $P_{DATA\_A}$ of the first data subchannel satisfies the following formula:

$$P_{DATA\_A} = \min\{P_{CMAX} - f(N, M - N), f(M - N) + P_O + \alpha \cdot PL\},$$

wherein:

$P_{CMAX}$ is the maximum transmit power, $f(N,M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_0$ is a target receive power of the second terminal apparatus, PL is a reference link loss, PL is a positive number, α is a link loss compensation coefficient, and α is greater than 0 and less than 1.

5. The method according to claim 3, wherein the transmit power $P_{control}$ of the control channel satisfies the following formula:

$P_{control}=\min\{P_{CMAX}-f(N,M-N),P_{MAX\_CC}-f(N,M-N), f(N)+P_O+\alpha \cdot PL\}$; and wherein the transmit power $P_{DATA\_A}$ of the first data subchannel satisfies the following formula:

$P_{DATA\_A}=\min\{P_{CMAX}-f(N,M-N),P_{MAX\_CC}-f(N,M-N),f(M-N)+P_O+\alpha \cdot PL\},$ wherein:

$P_{CMAX}$ is the maximum transmit power, $P_{MAX\_CC}$ is a maximum transmit power that satisfies a congestion control requirement, $f(N,M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

6. A power control apparatus, wherein the apparatus comprises:

a non-transitory memory storage comprising computer-executable instructions; and one or more processors, wherein the one or more processors execute the computer-executable instructions to cause the power control apparatus to perform operations comprising:

determining a transmit power of a control channel and a first data subchannel, wherein the control channel and the first data subchannel completely overlap in time domain and do not overlap in frequency domain;

determining that a transmit power of a second data subchannel is the same as the transmit power of the control channel and the first data subchannel, wherein the second data subchannel and the control channel overlap in frequency domain and do not overlap in time domain;

sending the control channel and the first data subchannel to a second terminal apparatus at the transmit power of the control channel and the first data subchannel; and sending the second data subchannel to the second terminal apparatus at the transmit power of the control channel and the first data subchannel.

7. The apparatus according to claim 6, wherein:

before determining the transmit power of the control channel and the first data subchannel, determining the control channel and a data channel, wherein the data channel comprises the first data subchannel and the second data subchannel.

8. The apparatus according to claim 6, wherein a bandwidth of the second data subchannel is M, a bandwidth of the control channel is N, a bandwidth of the first data subchannel is M−N, M is greater than N, and N is a positive integer; and the operations further comprise:

determining a transmit power $P_{control}$ of the control channel and a transmit power $P_{DATA\_A}$ of the first data subchannel based on a maximum transmit power, the bandwidth N of the control channel, and the bandwidth M−N of the first data subchannel; and using $P_{control}+P_{DATA\_A}$ as the transmit power of the control channel and the first data subchannel and as the transmit power of the second data subchannel.

9. The apparatus according to claim 8, wherein the transmit power $P_{control}$ of the control channel satisfies the following formula:

$P_{control}=\min\{P_{CMAX}-f(N,M-N),f(N)+P_O+\alpha \cdot PL\}$; and wherein the transmit power $P_{DATA\_A}$ of the first data subchannel satisfies the following formula:

$$P_{DATA\_A} = \min\{P_{CMAX} - f(N, M - N), f(M - N) + P_O + \alpha \cdot PL\},$$

wherein $P_{CMAX}$ is the maximum transmit power, $f(N,M-N)$ is a function of the bandwidth M−N of the first data subchannel and the bandwidth N of the control channel, $f(M-N)$ is a function of the bandwidth M−N of the first data subchannel, $f(N)$ is a function of the bandwidth N of the control channel, $P_O$ is a target receive power of the second terminal apparatus, PL is a reference link loss, PL is a positive number, α is a link loss compensation coefficient, and α is greater than 0 and less than 1.

10. The apparatus according to claim 8, wherein the transmit power $P_{control}$ of the control channel satisfies the following formula:

$P_{control}=\min\{P_{CMAX}-f(N,M-N),P_{MAX\_CC}-f(N,M-N), f(N)+P_O+\alpha \cdot PL\}$; and wherein the transmit power $P_{DATA\_A}$ of the first data subchannel satisfies the following formula:

$$P_{DATA\_A}=\min\{P_{CMAX}-f(N,M-N), P_{MAX\_CC}-f(N,M-N), f(M-N)+P_O+\alpha \cdot PL\}$$

wherein:

$P_{CMAX}$ is the maximum transmit power, $P_{MAX\_CC}$ is a maximum transmit power that satisfies a congestion control requirement, $f(N,M-N)$ is a function of the bandwidth M-N of the first data subchannel and the bandwidth N of the control channel, $f(M-N)$ is a function of the bandwidth M-N of the first data subchannel, $f(N)$ is a function of the bandwidth N of the control channel, $P_O$ is a target receive power of the second terminal apparatus, PL is a reference link loss, PL is a positive number, $\alpha$ is a link loss compensation coefficient, and $\alpha$ is greater than 0 and less than 1.

* * * * *